United States Patent

Goto et al.

[11] Patent Number: 6,026,250
[45] Date of Patent: Feb. 15, 2000

[54] CAMERA, BAR CODE READER FOR CAMERA AND METHOD OF DETECTING BAR CODE READING ERROR

[75] Inventors: Shigenori Goto; Hisashi Hamada; Shiro Hashimoto; Nobuhiro Aoki; Tokuji Sato, all of Saitama, Japan

[73] Assignees: Fuji Photo Film Co., Ltd., Kanagawa; Fuji Photo Optical Co., Ltd., Saitama, Japan

[21] Appl. No.: 08/987,353

[22] Filed: Dec. 9, 1997

[30] Foreign Application Priority Data

| Dec. 12, 1996 | [JP] | Japan | 8-332496 |
| Feb. 19, 1997 | [JP] | Japan | 9-035325 |
| Feb. 27, 1997 | [JP] | Japan | 9-043858 |
| May 14, 1997 | [JP] | Japan | 9-124094 |

[51] Int. Cl.⁷ .............. G03B 7/00; G03B 1/66
[52] U.S. Cl. .......... 396/210; 396/284; 396/266; 396/406
[58] Field of Search ............ 396/210, 207, 396/284, 397, 403, 406, 409, 266

[56] References Cited

U.S. PATENT DOCUMENTS

| Re. 34,452 | 11/1993 | Taniguchi | 396/207 |
| 5,109,241 | 4/1992 | Keeney | 396/207 |
| 5,845,869 | 12/1998 | Makino | 242/584.1 |

FOREIGN PATENT DOCUMENTS 6-289457  10/1994  Japan.

*Primary Examiner*—W. B. Perkey
*Attorney, Agent, or Firm*—Young & Thompson

[57] ABSTRACT

A camera for use with a Brownie roll film having a bar code containing data about a roll film, such as a film speed and a roll film type. The bar code is printed on an adhesive tape which secures light-shielding paper to a leading end of a photo filmstrip of the roll film. As soon as the roll film is loaded with its leading end of the light-shielding paper secured to a take-up spool of the camera, the camera starts rotating the take-up spool and, simultaneously, a reflective photo sensor starts scanning. Based on output signal from the photo sensor and the transport amount of the filmstrip, a first frame exposure portion of the filmstrip is automatically positioned behind an exposure aperture. The number of available exposures is derived from the roll film type data read from the bar code, and is displayed on an LCD panel. An automatic exposure control is effected while taking the film speed read from the bar code into consideration.

24 Claims, 22 Drawing Sheets

CAMERA, BAR CODE READER FOR CAMERA AND METHOD OF DETECTING BAR CODE READING ERROR

BACKGROUND OF THE INVENTION

1. Field of the Invention

The present invention relates to a camera, a bar code reader for the camera and a method of detecting bar code reading error. More particularly, the present invention relates to a medium-sized camera with a bar code reader for reading bar code provided on a Brownie film roll, and a method of detecting bar code reading error of the bar code reader.

2. Background Arts

ISO 120-type and 220-type rolled films are called Brownie film rolls in the art. In the 120-type, a 6 cm wide photo filmstrip is secured by an adhesive tape to a light-shielding paper which is longer than the filmstrip and backs the entire length of the filmstrip. The filmstrip is coiled with the backing paper around a spool. In the 220-type, short pieces of light-shielding paper are secured by adhesive tapes to opposite ends, i.e. leader and trailer, of a 6 cm wide photo filmstrip. Since the long backing paper is replaced by the short leader and trailer papers in the 220-type, a longer filmstrip, twice as long as the 120-type, is coiled around a spool in the 220-type. Unlike ISO-135 film rolls, the 120-type and 220-type film rolls are not contained in a cartridge shell. Hereinafter, the 120-type and 220-type film rolls will be referred to as the roll film.

Since the roll film is not provided with any device like DX code on the ISO-135 cartridge shell that allows the camera to read the film speed and the number of exposures available on each film roll, manual setup for adjusting the camera to the film speed is necessary after loading the roll film. The photographer should also calculate the remaining number of available exposures based on the initial number of available exposures and the number of accomplished exposures that is indicated by a count-up type frame counter. Where the camera is provided with a count-down type frame counter, the photographer must preset the frame counter to the initial number of available exposures.

An idea of providing a bar code on the adhesive tape connecting the filmstrip to the light-shielding paper is disclosed in U.S. patent application Ser. No. 08/712,387, now U.S. Pat. No. 5,845,869 that was filed based on Japanese Patent Applications No. 7-235127 et al. The bar code on the adhesive tape represents information about the roll film, such as the film speed, the film type and the number of available exposures, and is readable by a bar code reader having a reflective photo sensor.

For use in the camera, the bar code reader may not project light of the wavelength range the photo filmstrip is sensitive to, so that an infrared light emitting element, e.g. an infrared light emission diode, can only be used as a light source of the reflective photo sensor. In a case where the infrared light is projected directly toward the bar code, and the light receptive element receives reflected and diffused light directly from the bar code, the resolving power of this type photo sensor is relatively low, i.e. about 1.5 mm to 2.0 mm. Moreover, this type photo sensor is affected by light absorption or extinction factor of the black bar elements of the bar code.

On the other hand, since the adhesive tape, as well as the light-shielding paper and the filmstrip, is coiled around the spool, they are inevitably curled. According to the curl of the surface having the bar code thereon, the distance from the photo sensor can vary at most 1 mm or so. The variation in the distance adversely affects the accuracy of the photo sensor.

To prevent errors, it is desirable for the bar code on the roll film to make both the minimum width of the bar elements and the ratio of the maximum width to the minimum width as large as possible. According to the ISO standard for the roll film, the length of the adhesive tape in the lengthwise direction of the filmstrip is limited up to 25 mm. In order to scan the bar code while the roll film is advanced in the camera, the bar elements should be arranged side by side in the lengthwise direction of the filmstrip. To record requisite amount of information about the roll film by the bar code of this arrangement, the minimum width of the bar elements must be less than 1 mm.

In that case, a bar code reader using the reflective photo sensor having the above construction cannot accurately read the bar code. It is possible to use a photo sensor having a light projection lens and a light reception lens in front of light emitting and light receiving elements, for obtaining a higher resolving power. Because of the depth of focus of the lens system, this type photo sensor also has a larger capacity toward the variation in distance to the bar code. However, in comparison with the reflective photo sensor with no lens, the intensity of light received on the light receiving element is totally increased, and is more affected by the reflection factor of the surface on which the bar code is provided. Where the reflection factor of the surface having the bar code recorded thereon is high, the light reflected even from the black bar elements can be so high that it becomes difficult to discriminate between the black bar elements and the white bar elements.

Although it is possible to reduce the above problem by mounting the light emitting and receiving elements of the reflective photo sensor separately from each other and adjusting their relative positions and angles, this solution is not practical as for the photo sensor built in the mass-produced camera.

Moreover, since the adhesive tape is put only on the leading end of the filmstrip in the 120-type, the photo sensor scans the bar code only once during the preliminary loading of the roll film. Even if the bar code is stained, or damaged by wrinkles, the bar code reader is required to decode the bar code with accuracy based on the output signal from the photo sensor. Therefore, the bar code reader must be able to check if the output signal from the photo sensor includes any errors.

SUMMARY OF THE INVENTION

In view of the foregoing, a prime object of the present invention is to provide a camera with the bar code reader, which makes the good use of the bar code on the roll film for easy handling.

Another object of the present invention is to provide a bar code reader for a camera, which can reads the bar code on the roll film with accuracy.

A further object of the present invention is to provide a method of detecting reading error of the bar code and thus achieve highly accurate decoding of the bar code on the roll film.

To achieve the above object, the present invention provides a camera for use with a Brownie roll film consisting of a spool and a film slip rolled on the spool, the film slip comprising a photo filmstrip, light-shielding paper provided at least on leading and trailing ends of the filmstrip, an adhesive tape for securing the light-shielding paper to the filmstrip at least at the leading end of the filmstrip, and a bar code provided on at least one of the adhesive tape, the light-shielding paper and the spool, the camera comprising:

a film supply chamber for accepting the roll film;

a film take-up chamber with a take-up spool which is engaged with a leading end of the light-shielding paper of the roll film;

a film winding device for rotating the take-up spool to wind up the film slip onto the take-up spool; and a bar code reader for reading the bar code while the film slip is transported from the film supply chamber to the film take-up chamber.

According to a preferred embodiment, the number of available exposures is derived from the roll film type data read from the bar code, and is counted down upon each exposure. The count is displayed on an LCD panel. Each exposure is controlled considering the film speed read from the bar code. Based on output signal from the bar code reader and transport amount of the filmstrip that is detected in a conventional way, a first frame exposure portion of the filmstrip is automatically positioned behind an exposure aperture.

Where a bar code is provided on the adhesive tape, and the bar code consists of bar elements of a narrow width and bar elements of a wide width, the bar elements extending orthogonally to the transporting direction of the film slip, the camera according to the present invention is comprised of:

a reflective photo sensor mounted to face a film passageway between the film supply chamber and the film take-up chamber, for scanning the bar code while the film slip is transported from the film supply chamber to the film take-up chamber, the photo sensor comprising a light projecting element and a light receiving element; and a mask plate disposed in front of the photo sensor, the mask plate limiting a projection light path from the light projecting element and/or a reflection light path from the film slip to the light receiving element, so as to limit the width of detection range of the photo sensor to be less than the narrow width of the bar elements.

According to a preferred embodiment of the present invention, a bar code reader is comprised of a reflective photo sensor having a light projecting section and a light receiving section which are integrated into one body such that a projection light axis of the light projecting section and a reflection light axis of the light receiving section are fixed relative to each other, the light projecting section consisting of a light emitting element and a projection lens disposed in front of the light emitting element, the light receiving section consisting of a light receiving element and a light receiving lens disposed in front of the light emitting element, wherein the photo sensor is mounted in the camera such that a bar code surface having the bar code thereon passes through a cross point of the projection light axis and the reflection light axis while the photo film is transported through the film passageway, and that a bisector between the projection light axis and the reflection light axis is not perpendicular to the bar code surface in the film passageway.

According to the invention, an error checking method for checking if there is any error in output signal from a photo sensor that scans a bar code provided on a film slip of a roll film while the film slip is transported in a direction, the method comprising the steps of:

measuring transport length of the film slip;

determining a start and an end of scanning the bar code based on the output signal from the photo sensor;

detecting a length of the bar code as a transport length of the film slip measured during a time period from the start to the end of scanning the bar code;

comparing the measured length of the bar code with a preset actual length of the bar code; and determining that the output signal from the photo sensor includes an error when the measured length of the bar code is not identical to the preset actual length.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
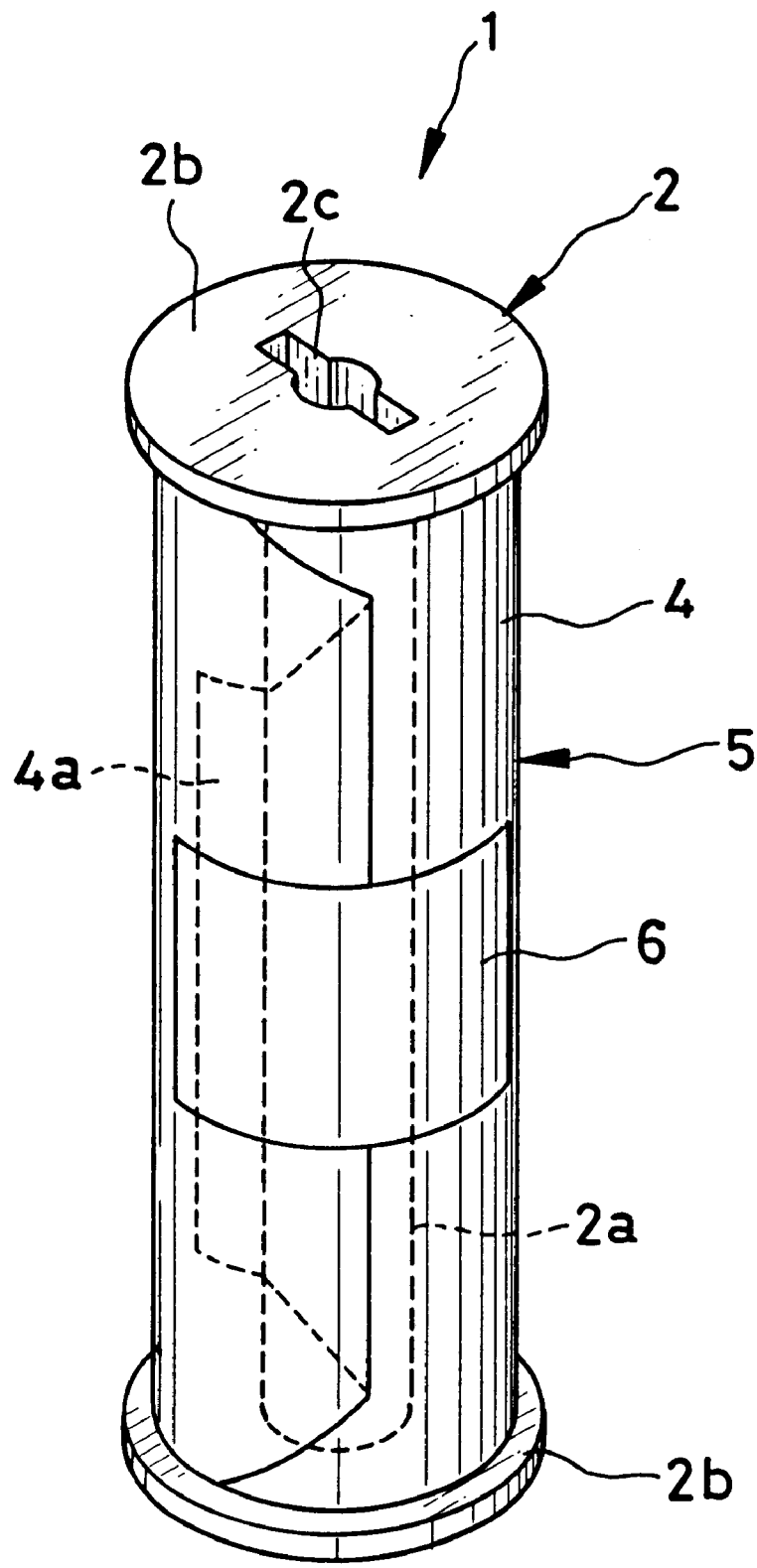
FIG. 1 is a perspective view of a photographic roll film consisting of a spool and a film slip wound on the spool.
Figure 2:
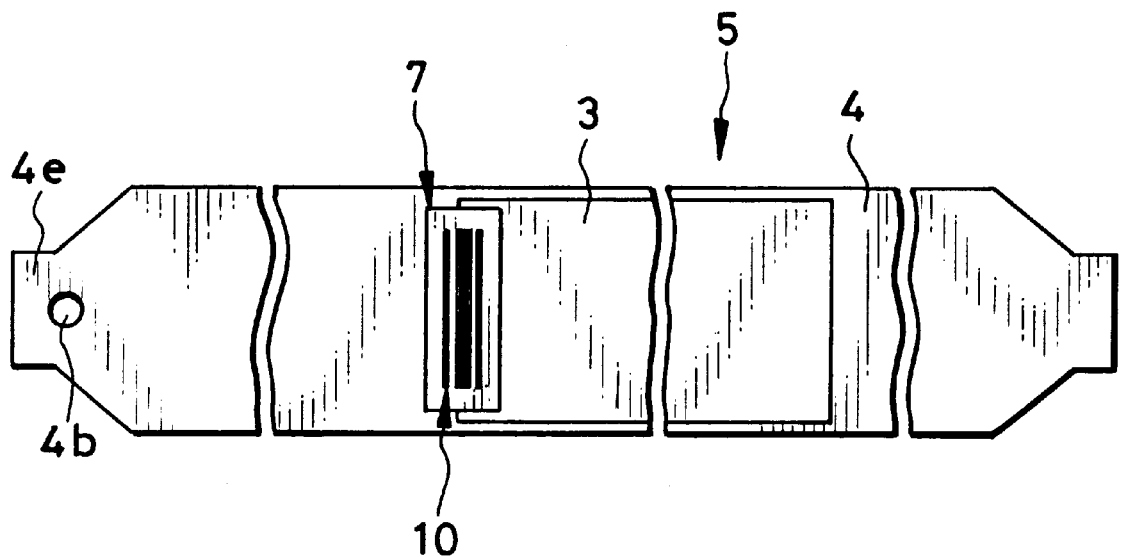
FIG. 2 is an explanatory view of a film slip of a 120-type roll film.

As shown in FIG. 1, an outer appearance of a photographic roll film 1 for use in a camera of the invention is similar to a conventional one regardless of whether it is of 120-type or 220-type. In the 120-type, a film slip 5 wound on a spool 2 consists of a photo filmstrip 3 and a light-shielding paper 4 backing the entire length of the filmstrip 3, as shown in FIG. 2. A leading end 4a of the light-shielding paper 4 in the outermost convolution of the roll film 1 is folded in and is secured by an adhesive tape 6. The spool 2 consists of a spool core 2a and a pair of flanges 2b. A pivot hole 2c for a rotary shaft of a camera is formed in a center of either flange 2b.

The light-shielding paper 4 has a hole 4b at its leading end 4a, so as to be hooked on a take-up spool in the camera. The filmstrip 3 is overlaid on a black inside surface of the light-shielding paper 4, and is secured at its leading end to the light-shielding paper 4 by an adhesive tape 7. The 120-type is classified into a standard type and a half type according to the length of the filmstrip 3. On the standard 120-type, 15 or 16 semi-brownie size frames (41.5 mm×56 mm) are available. On the half 120-type, 8 or 7 semi-brownie size frames are available.

Figure 3:
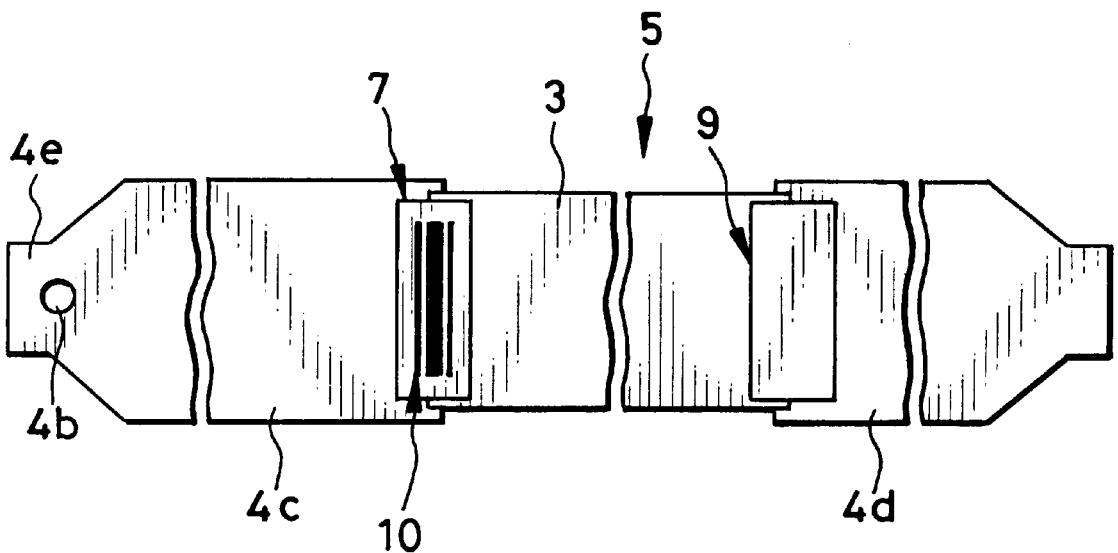
FIG. 3 is an explanatory view of a film slip of a 220-type roll film.
Figure 4:
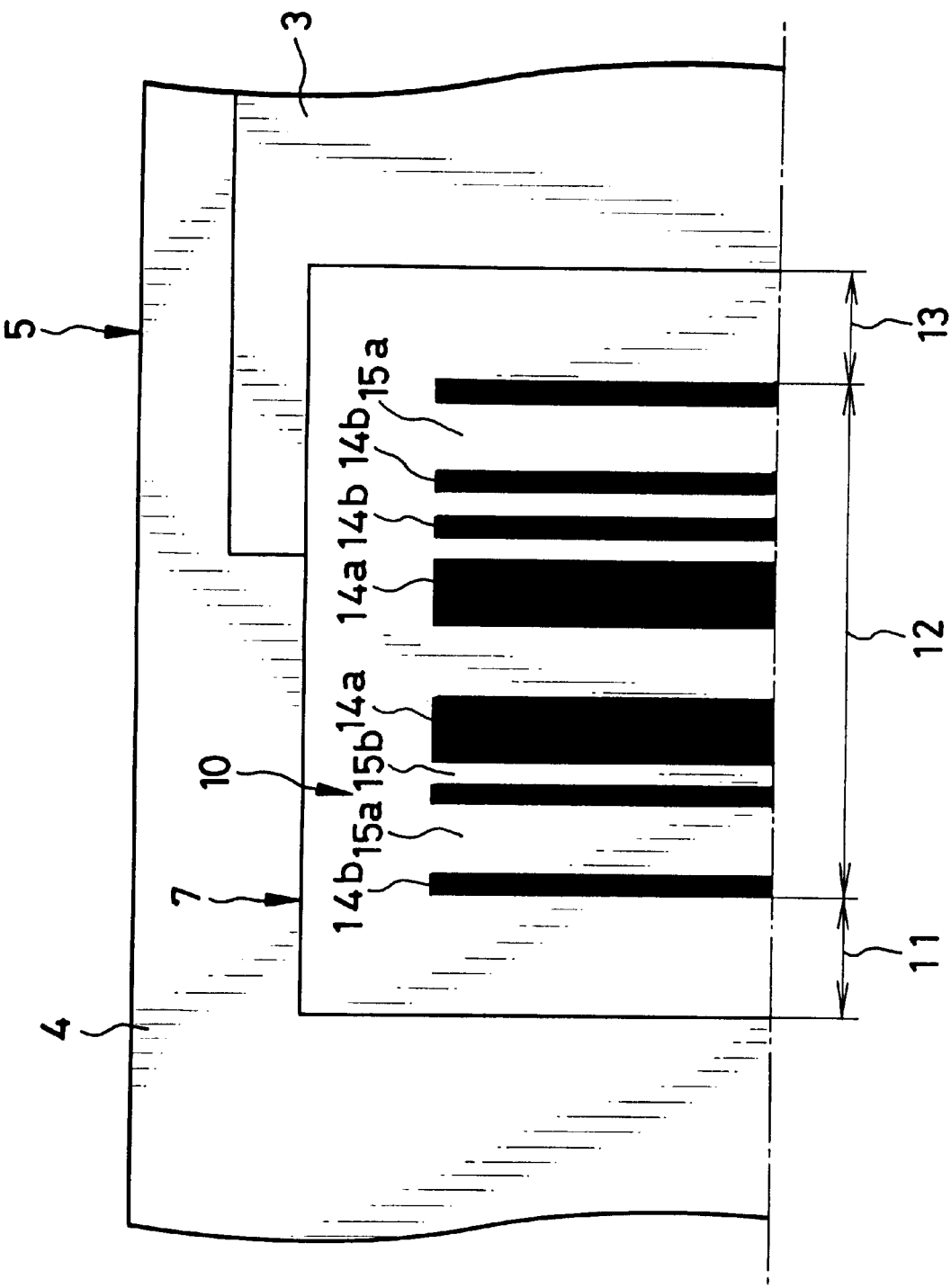
FIG. 4 is an enlarged view of an example of bar code recorded on an adhesive tape of a film slip.

FIG. 3 shows a film slip 5 of the 220-type, which consists of a photo filmstrip 3 and two pieces of light-shielding paper 4c and 4d which are spliced to opposite ends of the filmstrip 3. Hereinafter, the light-shielding paper 4c or 4d will be referred to as the leader paper 4c or the trailer paper 4d respectively when it is necessary to distinguish from each other. Adhesive tapes 7 and 9 are used for securing the leader and trailer papers 4c and 4d to the filmstrip 3 respectively. A leading end 4a of the leader paper 4c has the same shape as the leading end 4a of the light-shielding paper 4 of the 120-type, and is also formed with a hole 4b for engagement with the take-up spool.

The filmstrip 3 of the 220-type is about twice as long as that of the standard 120-type, so that it is possible to expose 30 semi-brownie size frames.

Figure 5:
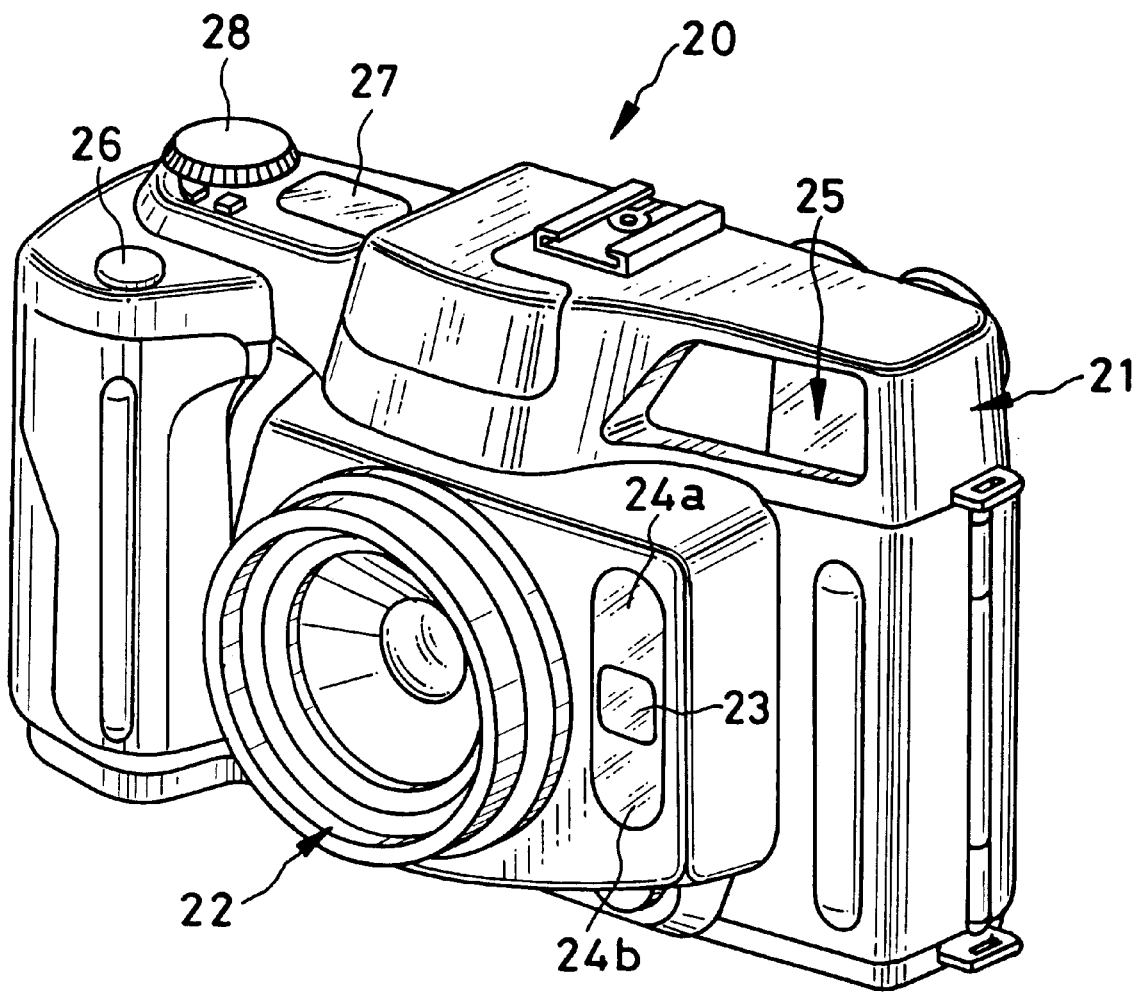
FIG. 5 is a front perspective view of a camera according to an embodiment of the present invention.

As shown in FIGS. 2 and 3, a bar code 10 is recorded on the adhesive tape 7 at the leading end of the filmstrip 3 in either type of roll film. FIG. 5 shows an example of bar code 10. The bar code 10 is formed by printing black parallel bars on a white obverse surface of the adhesive tape 7, each bar extending rectangularly to a lengthwise direction of the filmstrip 3. The bar code 10 consists of a data zone 12 having alternating black and white bar elements, and white high-reflective quiet zones 11 and 13 disposed before and behind the data zone 12 in the lengthwise direction of the filmstrip 3. The quiet zones 11 and 13 indicate leading and trailing ends of the data zone 12 respectively.

The data zone 12 consists of seven black bar elements and six white bar elements, so the data zone 12 always starts with a black bar element and ends with a black bar element. There are wide black bar elements 14a, narrow black bar elements 14b, wide white bar elements 15a and narrow white bar elements 15b. In this embodiment, the width of the narrow bar elements 14b and 15b is 0.92 mm, and the width of the wide bar elements 14a and 15a is 2.3 mm, that is 2.5 times that of the narrow bar elements 14b and 15b. The arrangement of these bar elements 14a, 14b, 15a and 15b represents information about the roll film 1: the film speed, the roll film type, such as the standard 120-type, the half 120-type, or the 220-type, and the kind of the filmstrip 3, such as white-and-black film or color film, negative film or positive film.

Specifically, each bar element represents one bit, and the wide bar elements 14a and 15a represent binary "1", whereas the narrow bar elements 14b and 15b represent binary "0", regardless of whether it is white or black. Leading three bar elements, i.e. the leading black bar element, the next white bar element and the following black bar element, constitute a 3-bit binary code, called type data, that represents a type of the roll film 1. In this embodiment, the three bar elements constituting the type data always includes one wide bar element and two narrow bar elements independently of whether it is white or black. For example, the standard 120-type is represented by type data "001", that is, a combination of a narrow black bar element 14b, a narrow white bar element 15b and a wide black bar element 14a in this order from the leading end 4a. In the same way, the half 120-type is represented by type data "010", and the 220-type is represented by type data "100". Since the length of the filmstrip 3 is determined by the roll film type, the type data also represents the film length and thus the number of available exposures.

Among the following ten bar elements of the data zone 12, the white bar elements constitute a white code that represents a numeric character of decimal notation, i.e. "0" to "9", and the black bar elements constitute a black code that also represents a numeric character "0" to "9". The white and black codes represent a film speed and a kind of the filmstrip 3 in combination. For example, if the white or black code is "01001", it represents "2" in decimal notation. If the white or black code is "11000", it represents "3" in decimal notation. When the white code represents "2" and the black code represents "3", the filmstrip 3 is a color negative filmstrip whose speed is of ISO-100. For a color negative filmstrip having a speed of ISO-125, the white code represents "6" and the black code represents "3". For a color negative filmstrip having a speed of ISO-400, the white code represents "2" and the black code represents "5". For a color reversal filmstrip having a speed of ISO-400, the white code represents "1" and the black code represents "5".

FIG. 5 shows a camera 20 that can photograph a frame in the semi-brownie size, so that it is possible to photograph 15 frames on the roll film 1 if it is the standard 120-type, or 7 frames on the half 120-type, or 30 frames on the 220-type.

On the front side of a camera body 21, there are a taking lens 22, a photometric window 23 for automatic exposure control, a pair of range finding windows 24a and 24b for automatic focusing, and a viewfinder 25. On the top of the camera body 21, there are a release button 26, a liquid crystal display (LCD) panel 27 for displaying information for the photography, and an operation dial 28 for various manual operations.

The taking lens 22 is focused on a subject range detected through the range finding windows 24a and 24b. The release button 26 has a half-depressed position and a full-depressed position. In the half-depressed position of the released button 26, the photometry for the automatic exposure control and the range finding are effected. When the release button 26 is fully depressed, a shutter is released to make an exposure. The release button 26 doubles as a start button for starting a first frame setting (FFS) program, as set forth in detail later.

Figure 6:
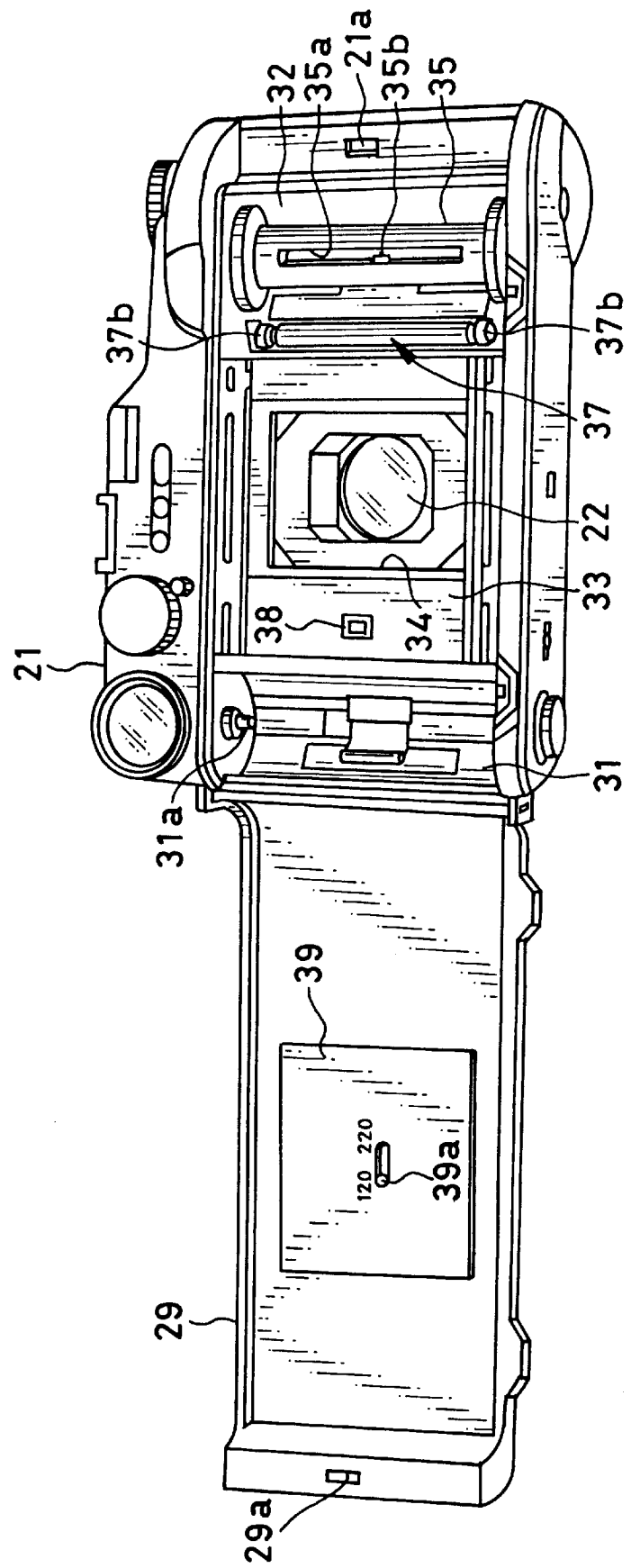
FIG. 6 is a rear perspective view of the camera shown in FIG. 5, with its rear lid opened.

FIG. 6 shows the rear side of the camera body 21 with its rear lid 29 opening. Inside the camera body 21, there are a film supply chamber 31, a film take-up chamber 32 and a film passageway 33 in between these chambers 31 and 32. An exposure aperture 34 defining the frame size on the filmstrip 3 is formed in a position of the film passageway 33 behind the taking lens 22.

The roll film 1 before exposure is set in the film supply chamber 31, with the pivot hole 2c of the spool 2 fit on a rotary shaft 31a that protrudes inward from the top wall of the film supply chamber 31. Thus, the roll film 1 is rotatable together with the shaft 31a inside the film supply chamber 31. The film take-up chamber 32 is provided with a take-up spool 35. The take-up spool 35 has the same construction as the spool 2, so a spool 2 of a used-up roll film 1 may be reused as the take-up spool 35.

Figure 7:
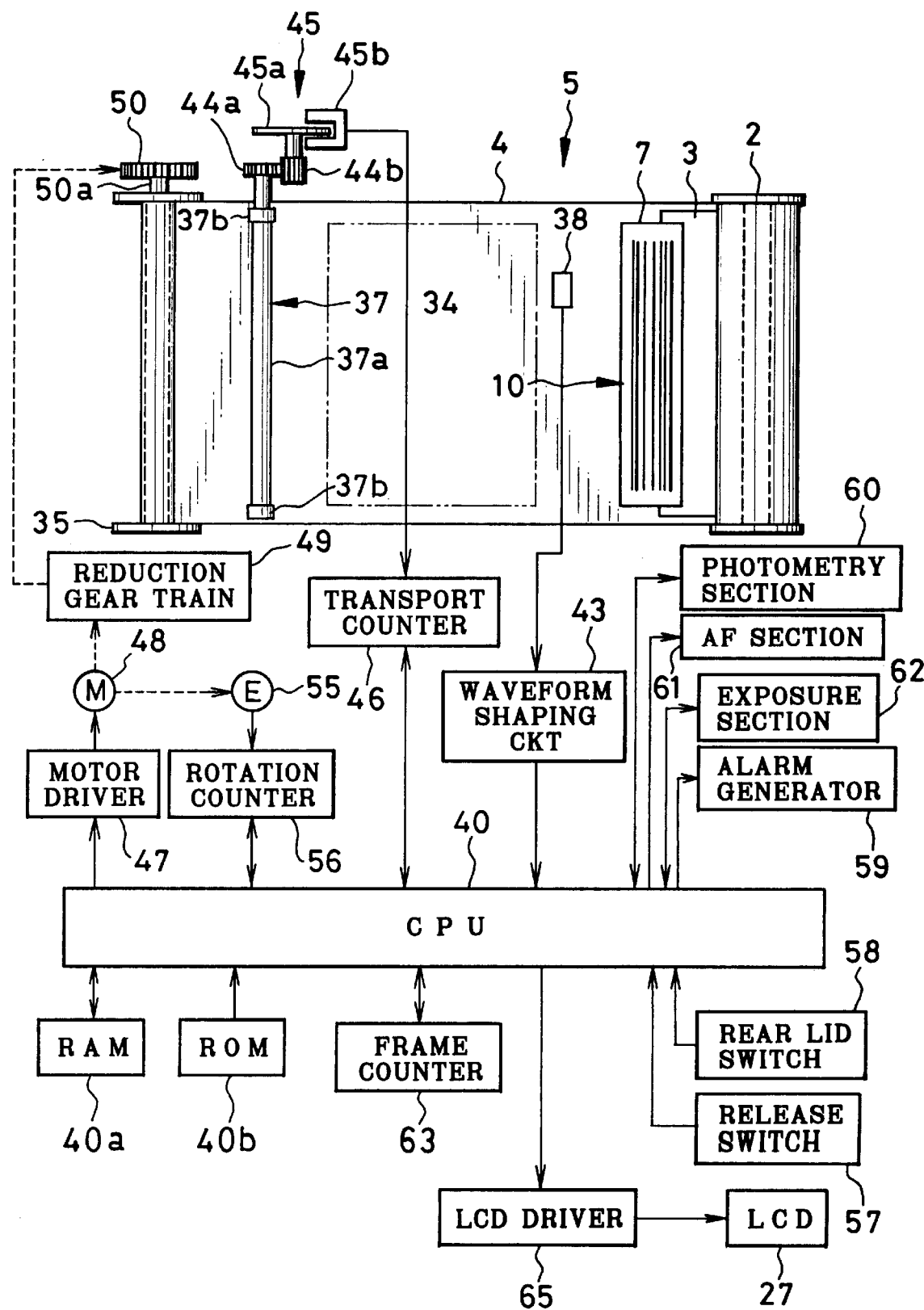
FIG. 7 is a schematic view of an electric construction of the camera.

To load the roll film 1, the leading end 4a of the light-shielding paper 4 or 4c is inserted into a slit 35a of the take-up spool 35. A hook 35b is formed inside the slit 35a, so the hole 4b of the leading end 4a is caught on the hook 35b. This makes it unnecessary to secure the film slip 5 to the take-up spool 35 by winding the light-shielding paper 4 or 4c a couple of times around the take-up spool 35 prior to the first frame setting. As shown in FIG. 7, the take-up spool 35 is rotated through a drive shaft 50a of the camera that is engaged in the pivot hole of the flange of the take-up spool 35.

A driven roller member 37 is disposed in the film supply chamber 31 near the film passageway 33. The driven roller member 37 is constituted of frictional rollers 37b, e.g. rubber rollers, secured to opposite ends of an axle 37a. The film slip 5 is in contact with the rollers 37b, so the driven roller member 37 is rotated along with the movement of the film slip 5. Thus, the rotational amount of the driven roller member 37 represents the transport length of the film slip 5.

A reflective photo sensor 38 is mounted in a wall surface of the film passageway 33 in between the exposure aperture 34 and the film supply chamber 31. The photo sensor 38 is positioned to face the bar code 10 on the adhesive tape 7 when the film slip 5 is transported through the film passageway 33. The photo sensor 38 projects infrared light toward the film slip 5 and receives light reflected from the film slip 5. Based on the signal level of photoelectric signal output from the photo sensor 38, that corresponds to the intensity of received light, the filmstrip 3 and the bar code 10 are detected.

The rear lid 29 covers the film supply chamber 31, the film take-up chamber 32 and the film passageway 33 to shield the interior of the camera body 21 in a light-tight fashion. The rear lid 29 is locked in the closed position through a locking claw 29a that engages in a locking hole 21a.

A pressure plate 39 is mounted on an inside surface of the rear lid 29, for pressing the filmstrip 3 from the back when it is positioned behind the exposure aperture 3. The position of the pressure plate 39 is adjustable in the optical axis direction of the taking lens 22 by setting a selection member 39a to a 120-type position or a 220-type position. Concretely, for the 120-type, the pressure plate 39 is set back by the thickness of the light-shielding paper 4 from the position for the 220-type. Thereby, the distance of the filmstrip 3 from the taking lens 22 is maintained unchanged in spite of the difference between the 120-type and the 220-type, that is, whether or not the light-shielding paper 4 exists behind the filmstrip 3.

The camera 20 has a CPU 40 that controls electric components of the camera 20 according to a program written in a ROM 40b, and also decodes the bar code 10 to determine the film speed, the film type and other film data. The CPU 40 stores the film data read from the bar code 10 in a RAM 40a. The RAM 40a functions as a work memory for temporarily storing data necessary for the various control of the CPU 40.

The photoelectric signal from the photo sensor 38 is sent to a waveform shaping circuit 43, which shapes the photoelectric signal by use of appropriate threshold levels to output a reflection signal with three levels: low (L), middle (M) and high (H) levels. The reflection signal has the low level when the photo sensor 38 scans the black inside surface of the light-shielding paper 4 or the black bar elements 14a and 14b. The reflection signal has the high level when the photo sensor 38 scans the quiet zone 11 or 13 or the white bar elements 15a and 15b. The reflection signal has the middle level when the photo sensor 38 scans the filmstrip 3 as its emulsion surface has a reflection factor that is higher than the black surface of the light-shielding paper 4 and the black bar elements 14a and 14b but lower than the quiet zones 11 and 13 and the white bar elements 15a and 15b. The reflection signal is sent to the CPU 40, which is used for the detection of the filmstrip 3, as well as for the decoding of the bar code 10.

A transport length encoder 45 is coupled to the axle 37a of the driven roller member 37 through gears 44a and 44b. The transport length encoder 45 has an encoder disc 45a that rotates with the axles 37a and is provided with a plurality of radial slits arranged at regular intervals around a rotary center of the encoder disc 45a. A photo interrupter or transparent type photo sensor 45b is provided in combination with the encoder disc 45a, for detecting the slits of the encoder disc 45a. The photo interrupter 45b is connected to a not-shown pulse generator which generates an encoder pulse upon each detection of the slit by the photo interrupter 45b. Instead of providing the slits in the encoder disc 45a, it is possible to provide high reflective sectors and low reflective sectors alternately around the rotary center of the encoder disc 45a, and detect encode pulses through a reflective photo sensor.

According to this configuration, the transport length encoder 45 generates one encode pulse per a given rotational amount of the driven roller member 37, that is, a given transport length of the film slip 5. Thus, the encode pulses from the transport length encoder 45 will be referred to as transport pulses. In this embodiment, each time the filmstrip 3 is transported by one frame, the encoder 45 generates about 40 transport pulses and sends them to a transport counter 46. The transport counter 46 counts up one by one upon each transport pulse. The count Cs of the transport counter 46 is sent to the CPU 40.

A motor driver 47 drives a transport motor 48 under the control of the CPU 40. The rotation of the transport motor 48 is transmitted through a reduction gear train 49 to a gear 50. The drive shaft 50a is formed on the bottom of the gear 50, so that the take-up spool 35 is rotated by the transport motor 48. In the first frame setting (FFS), the CPU 40 drives the transport motor 48 to rotate continuously till the first frame on the filmstrip 3 is positioned behind the exposure aperture 34. Thereafter, the transport motor 48 is rotated to wind up the filmstrip 3 one frame after another. After exposure of all available frames, the CPU 40 continues to rotate the transport motor 48 again till the entire length of the film slip 5 is wound up on the take-up spool 35.

A motor encoder 55 is connected to the transport motor 48. The motor encoder 55 has the same construction as the transport encoder 45, and outputs one encode pulse per given rotational angle of the transport motor 48. Hereinafter, encode pulses generated from the motor encoder 55 will be referred to as rotation pulses. In order to measure the width of each bar element of the bar code 10, the motor encoder 55 generates about seven pulses per 1 mm transport of the filmstrip 3 in a time period while the adhesive tape 7 passes by the photo sensor 38. The rotation pulses are sent to a rotation counter 56.

The rotation counter 56 counts up one by one upon each rotation pulse, and sends its count Cm to the CPU 40. Based on the count Cm, the CPU 40 discriminates between the wide bar elements 14a or 15a and the narrow bar elements 14b or 15b, to decode the bar code 10 in combination with the reflection signal from the waveform shaping circuit 43. The count Cm from the rotation counter 56 is used also for controlling stopping the transport motor 46.

As the diameter of the roll of film slip 5 around the take-up spool 35 increases, the amount of film slip 5 wound up by one rotation of the take-up spool 35 increases. Therefore, the count Cm, i.e. the number of rotation pulses, is not exactly proportional to the transport length of the film slip 5. However, because the variation in the diameter of the film roll on the take-up spool 35 is slight during the first frame setting, the count Cm substantially corresponds to the movement of the adhesive tape 7 in the film transport direction. Thus, it is possible to measure the width of each bar element of the data zone 12 from the number of the rotation pulses. In this way, the photo sensor 38, the waveform shaping circuit 43, the motor encoder 55, the rotation counter 56 and the CPU 40 constitutes a bar code reader.

A release switch 57 is actuated in cooperation with the release button 26. When the release button 26 is half depressed, the release switch 57 outputs a half-depression signal to the CPU 40. When the release button 26 is fully depressed, the release switch 57 outputs a full-depression signal to the CPU 40. The half-depression signal and the full-depression signal will be generically called the release signal.

A rear lid switch 58 is disposed inside the locking hole 21a, such that the rear lid switch 58 outputs a low level signal while the rear lid 29 is open, or a high level signal while the rear lid 29 is closed. The output signal from the rear lid switch 58, hereinafter called the rear lid signal, is sent to the CPU 40.

An alarm generator 59 is connected to the CPU 40, to alarm when there is the last one exposure available. A photometric section 60, which includes a photo sensor that is disposed behind the photometric window 23, measures a subject brightness and sends it to the CPU 40. The CPU 40 calculates an optimum aperture size and an optimum shutter speed based on the subject brightness and the film speed read from the bar code 10 and stored in the RAM 40a. An auto focus (AF) section 61 consists of a reflective photo sensor disposed behind the range finding windows 24a and 24b, and a lens driving device for focusing the taking lens 42 onto a subject distance determined by the range finding.

An exposure section 62 consists of a shutter mechanism and a stop mechanism, which are actuated upon the full depression signal from the release switch 57, to make an exposure in accordance with the aperture size and the shutter speed calculated by the CPU 40. The exposure section 62 outputs an exposure signal after each exposure. The exposure section 62 constitutes an exposure control device in combination with the CPU 40 and the photometric section 60.

When the CPU 40 detects an error of reading the bar code 10, in a manner as will be described in more detail later, the CPU 40 electrically deactivates the exposure section 62 or mechanically hinder the release button 26 from being depressed, to prevent improper exposures based on the wrong data about the roll film 1.

A frame counter 63 is provided for counting the remaining number of available exposures. The frame counter 63 is initialized to the total number of available exposures that is determined by the type data read from the bar code 10. As the camera 20 takes each frame in semi-brownie size, the initial value of the frame counter 63 is "15" for the standard 120-type, "7" for the half 120-type, or "30" for the 220-type. Needless to say, the initial value varies depending upon the frame size of the individual camera as well as the roll film type. The frame counter 63 counts down one by one after each exposure under the control of the CPU 40. The count Cf of the frame counter 63 is monitored by the CPU 40.

It is possible to count the remaining number of available exposures by use of the RAM 40a in place of the frame counter 63. The transport counter 46 and the rotation counter 56 may also be replaced by the RAM 40a.

An LCD driver 65 drives the LCD panel 27 to display various information. As shown for example in FIG. 8, the LCD panel 27 displays a roll film type indicia 66a, an available exposure number 66b, numbers 66c and 66d showing the shutter speed and the aperture size determined by the CPU 40, and a film speed indicia 66e. In addition, an indicia 66f for indicating an error, and an indicia 66g for indicating that a battery of the camera 20 is being run down may be displayed in a winking fashion at appropriate times.

The roll film type indicia 66a and the film speed indicia 66e are displayed based on the data read from the bar code 10 and stored in the RAM 40a. The available exposure number 66b is displayed based on the count Cf of the frame counter 63.

Figure 9:
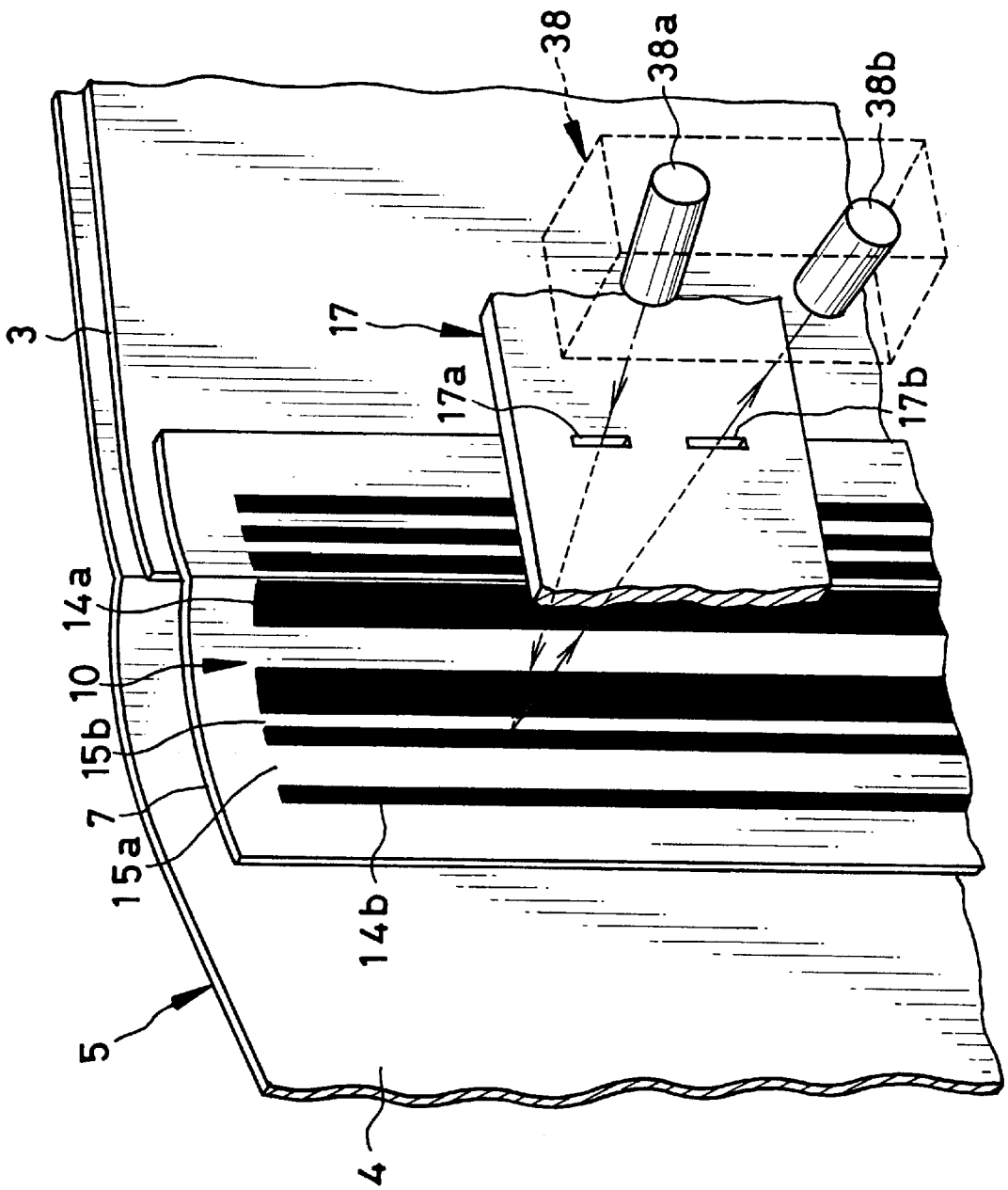
FIG. 9 is an explanatory view of a bar code reader according to another embodiment of the invention.
Figure 10:
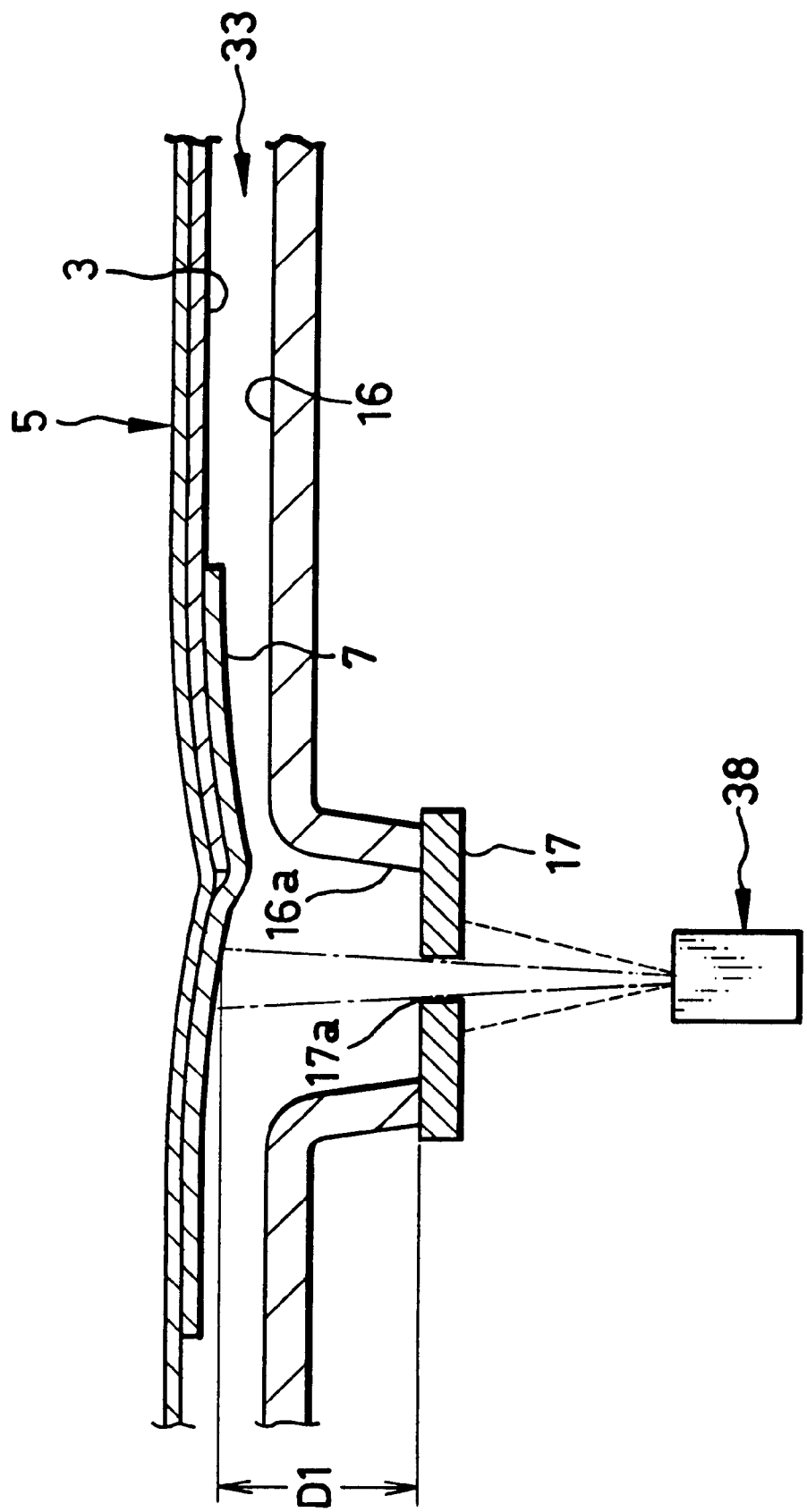
FIG. 10 is a sectional view of the bar code reader of FIG. 9.

FIGS. 9 and 10 show a bar code reader according to a preferred embodiment of the invention, wherein a mask plate 17 having a pair of slits 17a and 17b is disposed in front of the reflective photo sensor 38. The mask plate 17 is secured to an inside of a recessed portion 16a of a wall 16 of the film passageway 33.

As the filmstrip 3 and the light-shielding paper 4 are curled since the film slip 5 has been wound in the roll, the adhesive tape 7 is also curled and tends to bend along the border between the filmstrip 3 and the light-shielding paper 4. Therefore, as the film slip 5 is transported, the distance D1 from the mask plate 17 to the adhesive tape 7 and thus the distance from the photo sensor 38 to the bar code 10 fluctuates. However, the depth of the recessed portion 16a is so defined that the distance D1 is maintained to be more than a given value, e.g. 3 mm, that is large enough to prevent the fluctuation of the distance D1 from adversely affecting the bar code reading.

Figure 11:
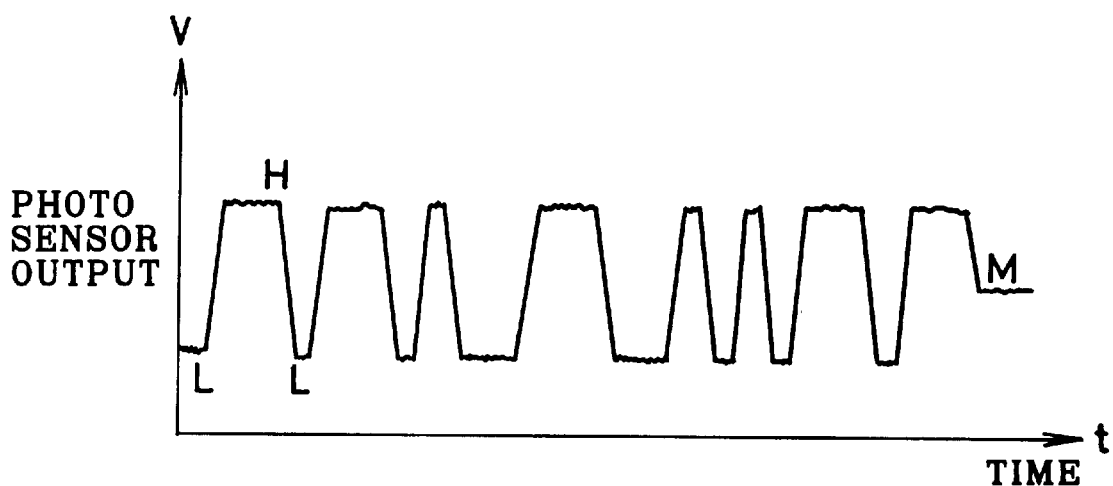
FIG. 11 is a diagram illustrating an example of photoelectric signal output from the photo sensor of FIG. 9.

The photo sensor 38 consists of a light emitting element 38a for projecting infrared light toward the film slip 5 through the slit 17a, and a light receiving element 38b for receiving light reflected from the film slip 5 through the other slit 17b. The light receiving element 38b outputs a photoelectric signal in correspondence with the intensity of the received reflection light. The slits 17a and 17b have a width that is less than the width of the narrow bar elements 14b and 15b, so the light projected onto the film slip 5 through the slit 17a and the light received on the light receiving element 38b are limited such that a detection range of the photo sensor 38 has a less width than the narrow bar width. Thereby, a change in intensity of the reflection light at the border between the black bar element 14a or 14b and the white bar element 15a or 15b appears as a sharp change in the signal level of the photoelectric signal, as is shown in FIG. 11.

Figure 29:
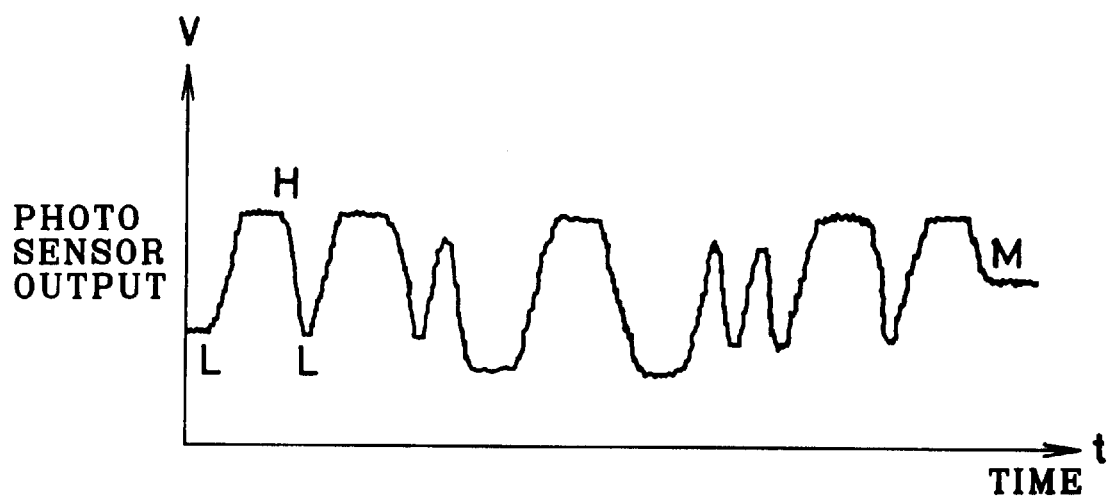
FIG. 29 is a diagram illustrating an example of photoelectric signal output from a conventional photo sensor.

Without the mask plate 17, on the contrary, the signal level of the photoelectric signal from the light receiving element 38 would change in a manner as shown in FIG. 29. Therefore, the border between the black bar elements and the white bar elements, and thus the widths of the respective bar elements cannot be exactly detected, much less when the adhesive tape 7 is curled or bent.

It is possible to provide a mask plate with a single slit. The single slit may be disposed only in front of one of the light emitting element 38a and the light receiving element 38b, in order to limit the detection range of the photo sensor 38. The length of the slit may be defined appropriately.

Instead of forming the slits 17a and 17b through the mask plate 17, it is possible to provide transparent narrow windows. The transparent windows may be formed integrally with a plastic mask plate. In that case, the windows may be formed from a transparent resin material, while other part of the mask plate is formed from a opaque resin material. It is also possible to form the mask plate from a transparent resin material, and coat the entire surfaces except the windows with opaque paint.

Although the above embodiment dispose the mask plate 17 in the recessed portion 16a from the film passageway 33 to separate the mask plate 17 sufficiently from the film slip 5 enough to prevent the influence of the fluctuation of the adhesive tape 7 on the photo sensor 38, it is possible to adopt another device for this purpose.

The operation of the camera 20 will now be described with reference to FIGS. 12 to 16.

When loading the roll film 1, the photographer opens the rear lid 29 and sets the selection member 39a to one of the two switching positions in accordance with the type of the roll film 1. Thereafter, the roll film 1 is positioned in the film supply chamber 31 with the pivot hole 2c of the spool 2 fit on the rotary shaft 31a. Then, the adhesive tape 6 is removed, and the leading end 4a of the light-shielding paper 4 is unfolded. The leading end 4 is inserted into the slit 35a of the take-up spool 35a, thereby the hole 4b is caught on the hook 35b. Thereafter when the rear lid 29 is closed, the rear lid signal from the rear lid switch 58 changes from the low level to the high level.

Figure 12:
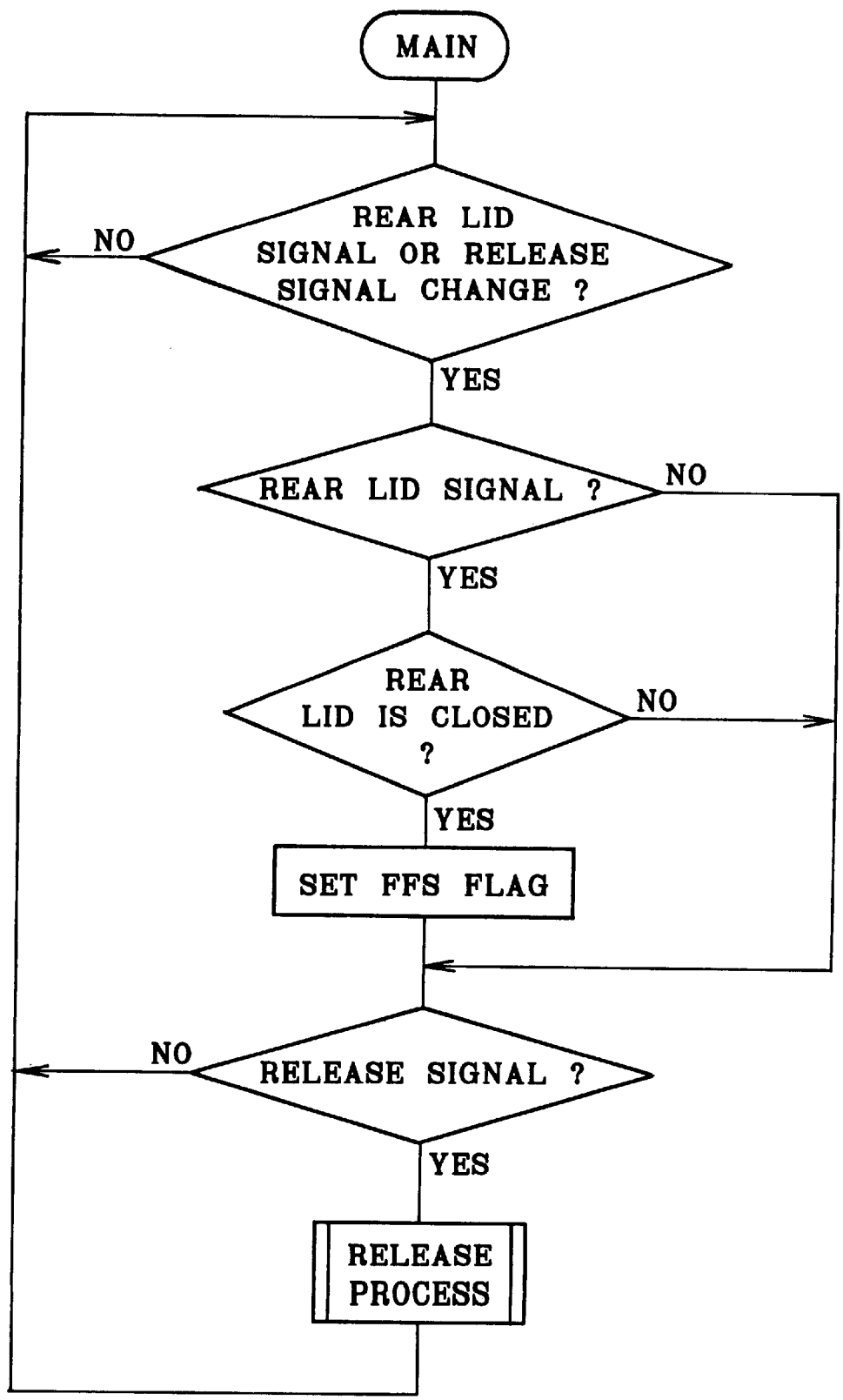
FIG. 12 is a flow chart illustrating a main routine for an CPU of the camera.

The CPU 40 always conducts a main routine as shown in FIG. 12. When the rear lid signal changes from the low to the high level, then the CPU 40 sets a flag for the first frame setting in an internal register. Thereafter when the release button 26 is depressed halfway or to the full, the release switch 57 outputs the release signal to the CPU 40. Upon the release signal, the CPU 40 starts a release process.

Figure 13:
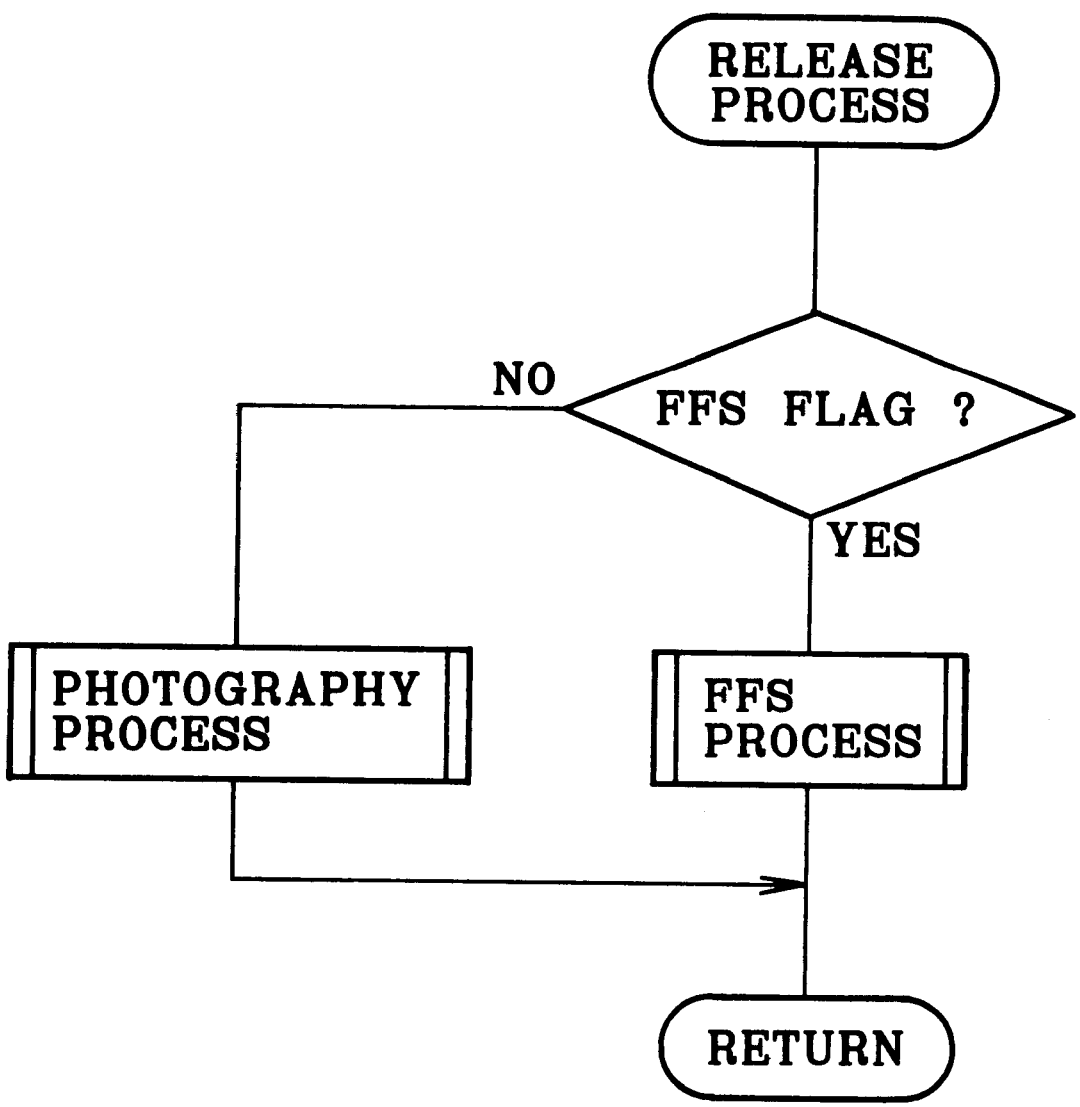
FIG. 13 is a flow chart illustrating a sub-routine for a release process executed by the CPU.
Figure 14:
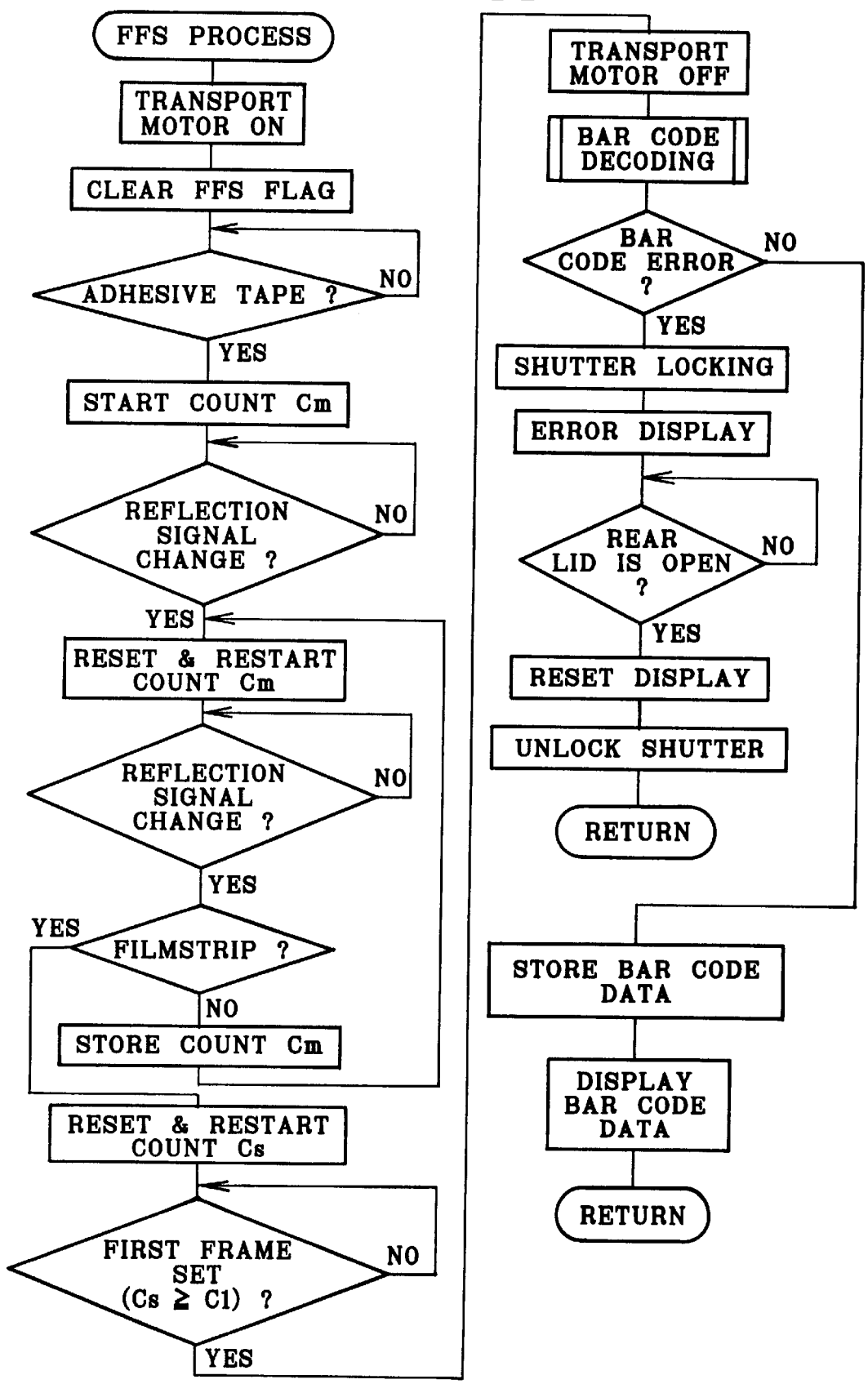
FIG. 14 is a flow chart illustrating a program for setting a first frame exposure position behind the exposure aperture of the camera.
Figure 15:
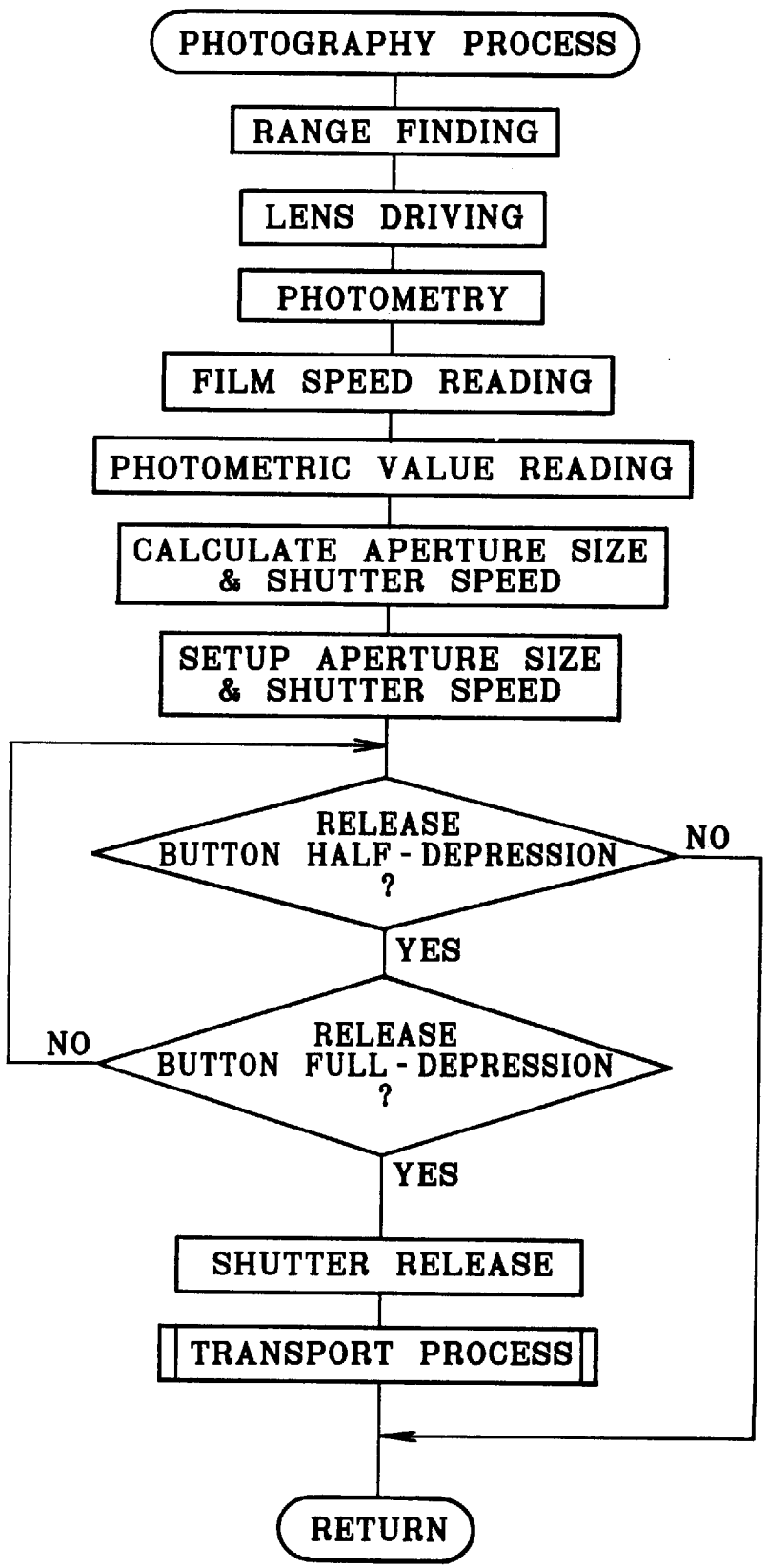
FIG. 15 is a flow chart illustrating a program for photography.

In the release process, as shown in FIG. 13, the CPU 40 first checks if the flag for the first frame setting is set in the internal register. Since that flag is set at the time when the rear lid 29 is closed, the CPU 40 executes a program for the first frame setting, as shown in FIG. 14, rather than a program for an exposure, as shown in FIG. 15. It is alternatively possible to execute the sub-routine for the first frame setting as soon as the rear lid 29 is closed.

In the first frame setting, the CPU 40 first drives the transport motor 48 and, at the same time, clears the flag for the first frame setting off the internal register so the exposure sub-routine is executed upon the next release signal. As the transport motor 48 rotates, the take-up spool 35 is rotated in the winding direction through the gear 50 and the drive shaft 50a. Thereby, the light-shielding paper 4 of the roll film 1 is wound onto the take-up spool 35, while being transported from the film supply chamber 31 through the film passageway 33.

The CPU 40 activates the photo sensor 38 simultaneously with the start of driving the transport motor 48. As long as the photo sensor 38 detects the black inside surface of the light-shielding paper 4, the reflection signal from the wave form shaping circuit 43 takes the low level. When the adhesive tape 7 comes to the detection range of the photo sensor 38, the reflection signal changes to the high level, because the photo sensor 38 first detects the leading quiet zone 11 at that time. When the CPU 40 detects the leading end of the adhesive tape 7 by the change of the reflection signal from the low to the high level, the CPU 40 starts reading and decoding the bar code 10.

First, the CPU 40 measures the width of the individual bar element of the data zone 12. For this purpose, the CPU 40 resets the rotation counter 56 to zero to restart counting rotation pulses from zero each time the reflection signal changes its level. Thus, the number of rotation pulses generated from the motor encoder 55 is counted up from zero upon each detection of borders between the black bar elements and the white bar elements.

Specifically, when the leading black bar element 14a or 14b, following the leading quite zone 11, comes to the photo sensor 38, the reflection signal changes from the high to the low level. Then, the CPU 40 resets the rotation counter 56 to zero to restart counting rotation pulses from zero. When the leading black bar element 14a or 14b goes past the photo sensor 38, the reflection signal changes from the low to the high level. Then, the CPU 40 reads the count Cm of the rotation counter 56, which represents the number of rotation pulses generated during the passage of the leading black bar element 14a or 14b by the photo sensor 38. The CPU 40 writes the count Cm in the RAM 40a as first width data that substantially corresponds to the width of the leading black bar element 14a or 14b. At the same time, the CPU 40 resets the rotation counter 56 to zero to restart counting transport pulses from zero.

Thereafter when the reflection signal changes from the high to the low level, it means that the second bar element, i.e. the white bar element 15a or 15b following the leading black bar element, goes past the photo sensor 38. Then, the CPU 40 reads the count Cm of the rotation counter 56, and writes it in the RAM 40a as second width data that substantially corresponds to the width of the white bar element 15a or 15b following the leading black bar element 14a or 14b. In the same way, third to thirteenth width data for the third to last bar elements of the data zone 12 are sequentially detected and written in the RAM 40a.

When the trailing quiet zone 13 goes past the photo sensor 38, the photo sensor 38 begins to scan the filmstrip 3, so that the reflection signal changes from the high level to the middle level. Then, the CPU 40 terminates the width measurement of the bar elements by not storing the count Cm that is obtained at the change of the reflection signal from the high level to the middle level.

On the other hand, in order to position the first frame exposure portion of the filmstrip 3 behind the exposure aperture 34, the CPU 40 resets the transport counter 46 to zero to start counting from zero upon receipt of the middle level reflection signal. Since the driven roller member 37 is rotated along with the movement of the film slip 5, the count Cs of the transport counter 46 represents the advanced length of the film slip 5.

The CPU 40 stops the transport motor 48 to stop transporting the film slip 5 when the count Cs reaches a given value C1. The value C1 is determined by the number of transport pulses necessary from the detection of the leading end of the filmstrip 3 to the position where the first frame exposure portion stops behind the exposure aperture 34.

After the stop of the transport motor 48, the CPU 40 discriminates between the wide and the narrow bar elements of the bar code 10 on the basis of the first to thirteenth width data stored in the RAM 40*a*, to determine the binary values of the respective bits of the bar code 10. The determined binary values are stored in the RAM 40*a*.

Since the first three bar elements always consist of one wide bar element 14*a* or 15*a* and two narrow bar elements 14*b* and/or 15*b*, and the width of the wide bar element 14*a* or 15*a* is 2.5 times that of the narrow bar element 14*b* or 15*b*, the total width of the first three bar elements must be 4.5 times the narrow bar width. Accordingly, the CPU 40 adds up the first to third width data, and calculates from the obtained total a rotation pulse number that corresponds to an average between the wide bar width and the narrow bar width. The calculated rotation pulse number is used as reference data for discrimination between the wide bar elements and the narrow bar elements. That is, if the width data is above the reference data, the corresponding bar element is determined to represent binary "1". If the width data is below the reference data, the corresponding bar element is determined to represent binary "0".

Depending upon the obtained bit pattern of the type data, the CPU 40 determines the type of the loaded roll film 1. In the same way, the binary values of the following ten bits are determined by comparison of the fourth to thirteenth width data with the reference data, to decode the white code and the black code. Depending upon the combination of the white code and the black code, the CPU 40 determines the film speed and the kind of the filmstrip 3. The roll film type, the film speed of the film kind are stored in the RAM 40*a*. Furthermore, the CPU 40 determines the number of available exposures in accordance with the roll film type, and write it in the RAM 40*a*.

Then, the CPU 40 sets up the frame counter 63 with the number of available exposures as an initial value of the count Cf. The CPU 40 also drives the LCD 27 to display the count Cf as the available exposure number 66*b*, in addition to the film roll type indicia 66*a* and the film speed indicia 66*e*. Thus, the first frame setting is accomplished.

Figure 8:
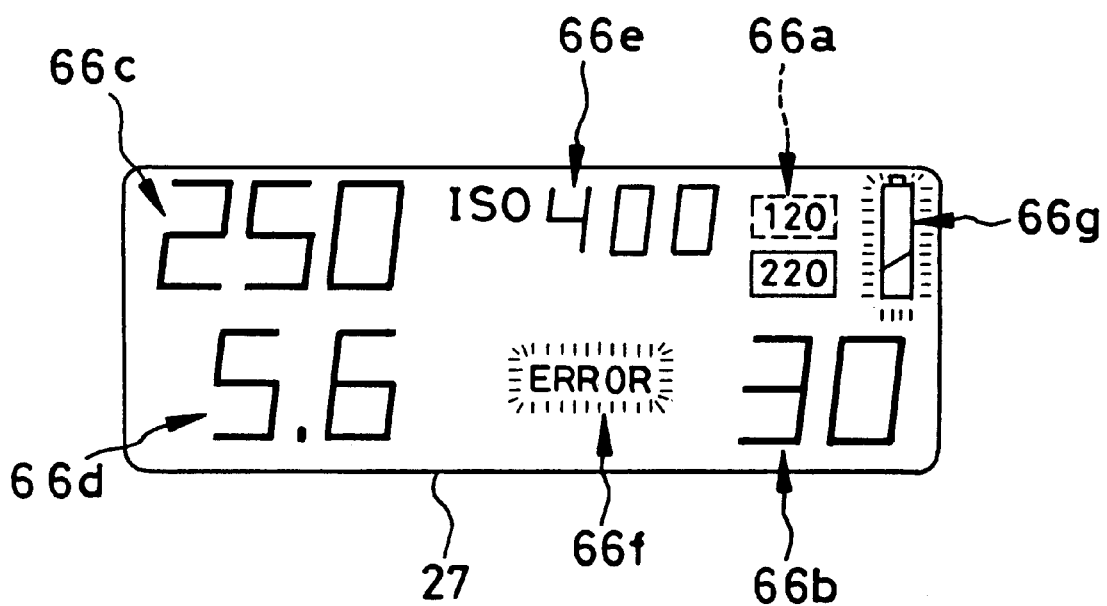
FIG. 8 is an explanatory view of an example of liquid crystal display panel.

As a result, the LCD 27 displays "220" as the film roll type indicia 66*a*, "30" as the available exposure number 66*b*, and "400" as the film speed indicia 66*e*, as shown in FIG. 8, when the loaded roll film 1 is the 220-type and the film speed of the filmstrip 3 is of ISO-400.

However, if there is something unusual in the data read from the bar code 10, such as when the number of detected width data is less than or more than thirteen, when the combination of the white code and the black code is not a predetermined one, or when the width data is excessively large or small compared with designed values, the CPU 40 regards it as a bar code error. For example, when a fault signal is included in the photoelectric signal from the photo sensor 38 because of a stain on the adhesive tape 7 or a winkle of the adhesive tape 7, more than thirteen width data may be obtained. In that case, the CPU 40 electrically deactivates the exposure section 62, to prevent improper exposures based on the wrong data about the roll film 1. This function will be referred to as the shutter locking. Simultaneously, the CPU 40 displays the error indicia 66*f* on the LCD 27, to warn the photographer that there is something wrong in the data read from the bar code 10.

Then, the photographer should correct the position of the roll film 1 by reloading it in the camera 20 inside a dark room or a dark bag, or can load a new roll film. After the reloading or the loading of the new roll film, the first frame setting is carried out in the same way as above. When the rear lid 29 is opened, the shutter locking is terminated, that is, the exposure section 62 is enabled to operate. It is alternatively possible to continue the shutter locking until the bar code 10 is correctly read. It is also possible to permit manual setting of the film speed, the roll film type and the available exposure number when the bar code error is detected. For the manual setting, the operation dial 28 may be used. This configuration makes it possible to load the camera 20 with a roll film having no bar code.

Even if the photographer fails to notice the error indicia 66*f* and depresses the release button 26, the exposure section 62 would not operate because of the shutter locking by the CPU 40, so that improper exposures based on the wrong data about the roll film 1 is prevented.

After the bar code 10 is correctly read, and the first frame exposure portion of the filmstrip 3 is positioned behind the exposure aperture 34, the photographer can photograph a frame by depressing the release button 26 to the full. As shown in the main routine of FIG. 12 and the sub-routine of FIG. 13, when a release signal is entered after the first frame setting, the CPU 40 executes a photography program according to a sequence shown in FIG. 15.

In response to the first entered release signal, i.e. the half depression signal, the AF section 61 is activated to find a subject range and focus the taking lens 22 on the subject range. Concurrently, the photometric section 60 measures a subject brightness. Based on the subject brightness and the film speed read from the bar code 10, the CPU 40 calculates an optimum aperture size and an optimum shutter speed. In accordance with the aperture size and the shutter speed calculated by the CPU 40, the exposure section 62 is actuated to make an exposure upon the full depression of the release button 26.

Figure 16:
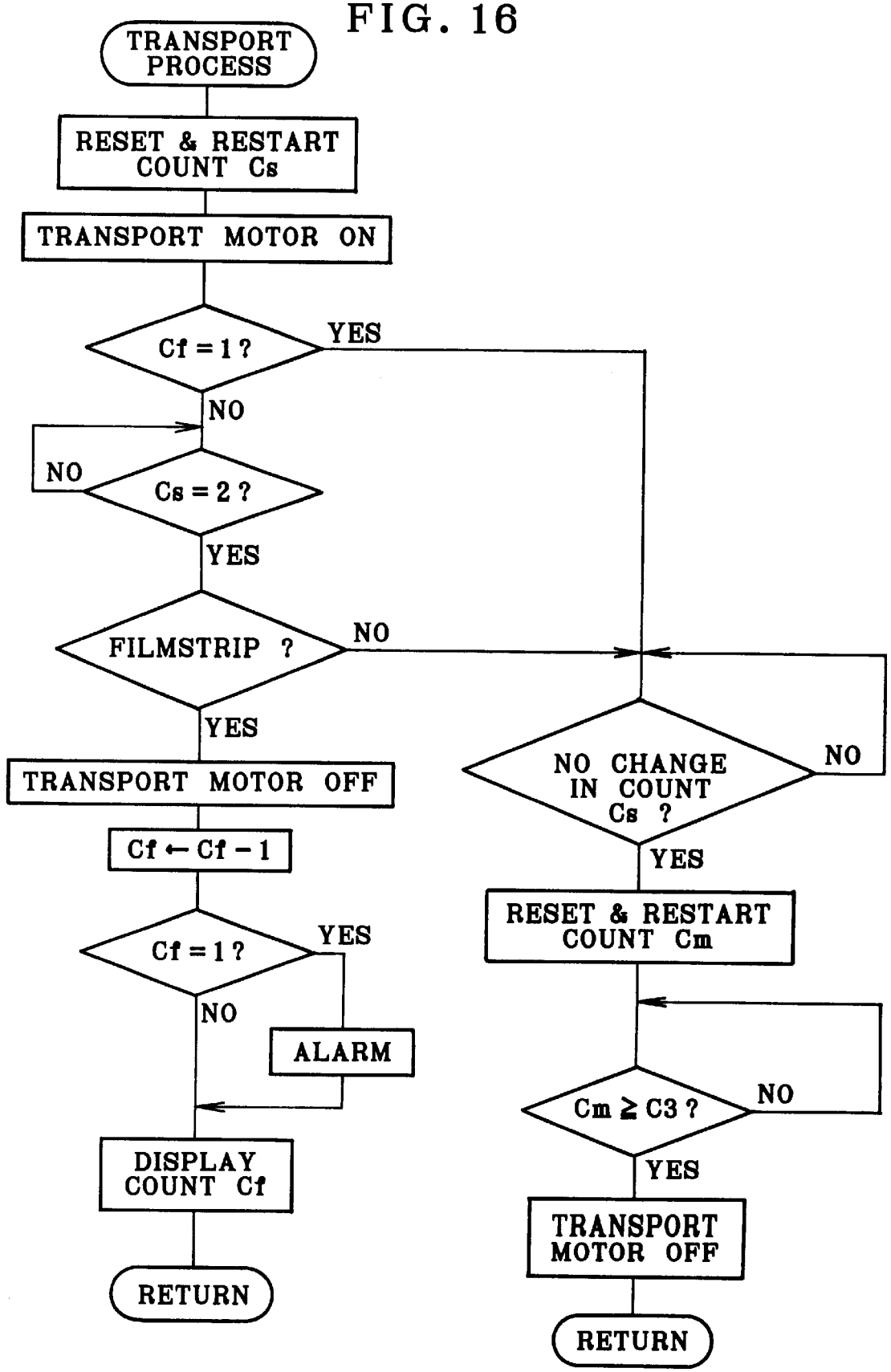
FIG. 16 is a flow chart illustrating a program for transporting the film slip.

After completing the exposure, the exposure section 62 outputs an exposure signal to the CPU 40. Then, the CPU 40 executes a program for transporting the film slip 5, as shown in FIG. 16. First, the CPU 40 resets the count Cs of the transport counter 46 to zero to restart counting transport pulses from zero, and starts driving the transport motor 48 to wind up the filmstrip 3 10 onto the take-up spool 35.

Thereafter, the CPU 40 checks if the count Cf of the frame counter 63 is "1". If so, the CPU 40 determines that all available exposures have been made, and starts a final winding process. Since the count Cf is not "1" after the exposure of the first frame, the CPU 40 starts a one-frame advancing process.

In the one-frame advancing process, the CPU 40 monitors the count Cs of the transport counter 46, and compares the count Cs with a given value C2. When the count Cs reaches the given value C2, the CPU 40 stops the transport motor 48 after confirming that the photo sensor 38 is scanning the filmstrip 3 then. The value C2 is determined to be equal to or slightly more than the number of transport pulses that corresponds to the length of one frame in the lengthwise direction of the filmstrip 3. Thus, the filmstrip 3 is advanced by one frame to position the next frame exposure portion behind the exposure aperture 34.

After the stop of the transport motor 48, the CPU 40 lets the count Cf of the frame counter 63 down by one, e.g. from "30" to "29" in this instance. Thereafter, checks again if the count Cf is "1". Since the count Cf is not "1", the CPU 40 revises the available exposure number 66b on the LCD panel 27 in correspondence with the count Cf.

Thereafter, the second and following exposures are made in response to the release signals from the release switch 57, in the same way as above, and the latest available exposure number 66b is displayed on the LCD panel 27. When the filmstrip 3 has been advanced one frame after the second from the last available exposure is made, the count Cf of the frame counter 63 comes down to "1". Then the CPU 40 activates the alarm generator 59 to sound an alarm, and revises the available exposure number 66b to "1". So the photographer is aware of the end of the presently loaded roll film 1 in advance, and is able to prepare the next roll film to load.

After the last exposure is accomplished, the CPU 40 resets the count Cs of the transport counter 46 to zero to restart counting transport pulses from zero, and drives the transport motor 48, in the same way as in the foregoing one-frame advancing. However, since the count Cf is "1", the CPU 40 executes the final winding process. In the final winding process, the CPU 40 checks when the count Cs of the transport counter 46 stops changing, that is, when the trailing end of the film slip 5, i.e. the trailing end of the light-shielding paper 4 or 4d, goes past the driven roller member 37. Then, the CPU 40 resets the count Cm of the rotation counter 56 to zero, to restart counting the rotation pulses from zero.

When the count Cm reaches a given value C3, the CPU 40 stops the transport motor 48. The value C3 is determined to be larger enough than the number of rotation pulses that are to be generated from the time when the trailing end of the film slip 5 goes past the driven roller member 37 till the entire length of the film slip 5 is wound up onto the take-up spool 35. Thereby, the final winding process is terminated after the film slip 5 is completely wound around the take-up spool 35.

When the transport motor 48 stops are the final winding process, the rear lid 29 is unlocked, so the rear lid 29 can be opened to take the take-up spool 35 having the film slip 5 of the exposed filmstrip 3 wound thereon out of the film take-up chamber 32. It is possible to sound an alarm or display an indicia on the LCD panel 27 to inform the photographer of the end of the final winding process.

Although the kind of the filmstrip 3 read from the bar code 10 is not displayed on the LCD panel 27 in the embodiment shown in FIG. 8, it is of course possible to display the kind of the filmstrip 3 on the LCD panel 27. It is also possible to control the exposure value in accordance with the kind of the filmstrip 3. For example, as a reversal film has a relatively narrow latitude, the exposure value is determined considering the narrow latitude.

For warning that only one exposure remains available on the loaded roll film 1, a visual warning, such as lighting an LED in the viewfinder 25 or winking the available exposure number 66b on the LCD panel 27, is possible instead of or in addition to the alarm. Similarly, when the bar code error is detected, it is possible to sound an alarm or light an LED in the viewfinder 25 instead of or in addition to the winking error indicia 66f on the LCD panel 27.

The above described configuration of the bar code 10 is not limitative of the present invention. Moreover, it is possible to measure the width of each bar element from transport pulses from a transport encoder coupled to the driven roller member 37, though the transport encoder must have a sufficiently high resolving power enough to measure the narrow bar width without fail. That is, the number of transport pulses per unit length of the film transport should be increased. Alternatively, it is possible to provide clock marks at regular intervals along the lengthwise direction of the filmstrip 3 in addition to the bar code, e.g. in parallel with the bar code on the adhesive tape, such that the clock marks are scanned by another photo sensor concurrently with the scanning of the bar code by the photo sensor 38. Thereby, the width of each bar element may be measured by the detection intervals of the clock marks.

Instead of the above described method for detecting a bar code error, it is possible to measure the advanced length of the film slip 5 during a time period while the widths of the respective bar elements are measured, and compare the advanced length with a predetermined length of the data zone 12 in the lengthwise direction of the filmstrip 3, to determine it as a bar code error when the advanced length is not identical with the predetermined length of the data zone 12. This method will be described in more detail with reference to FIGS. 17 and 18.

Figure 17:
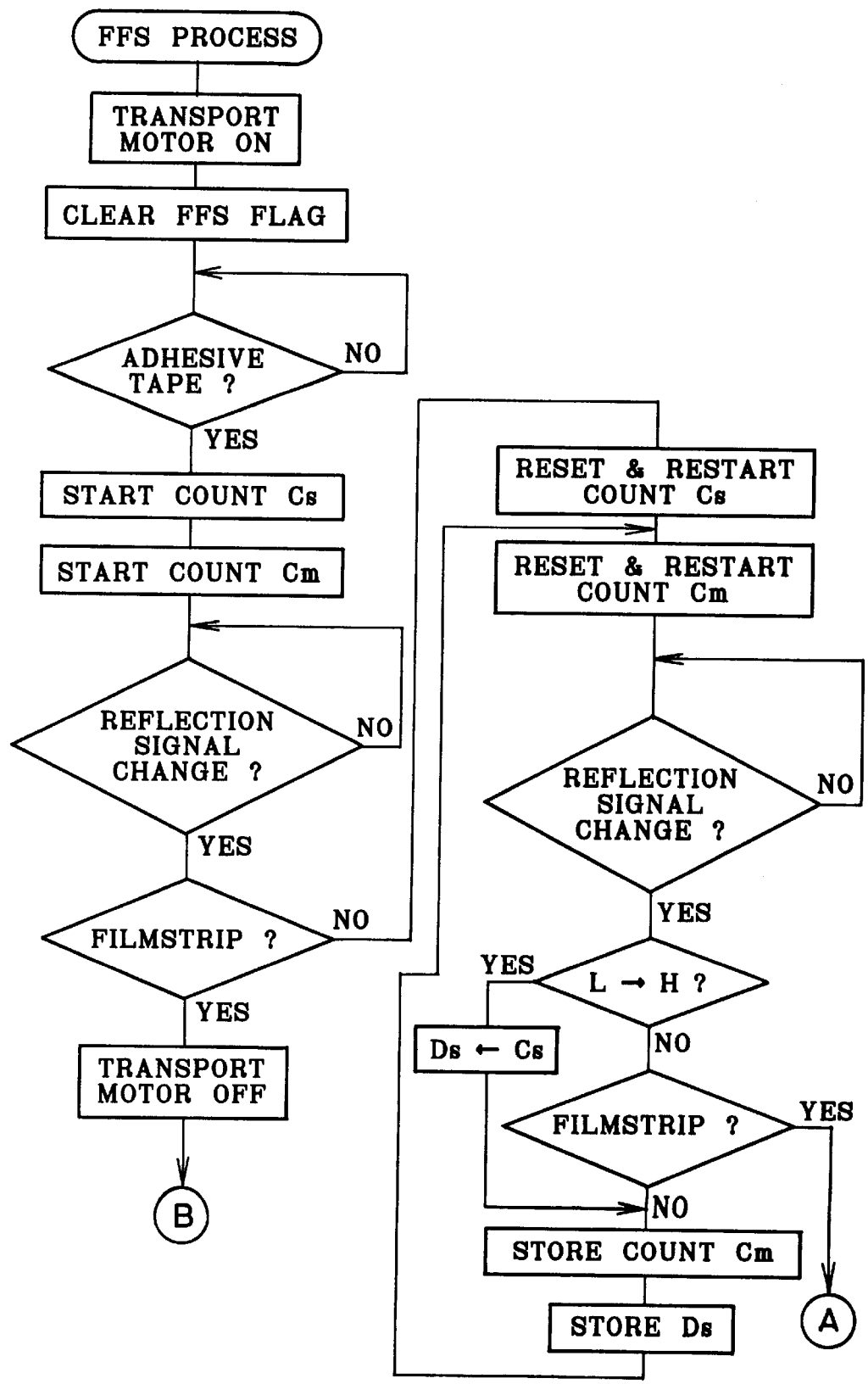
FIGS. 17 and 18 show a flow chart illustrating a program for setting a first frame exposure portion behind the exposure aperture of the camera, according to another embodiment of the invention.

The ROM 40b previously stores reference length data Dr for use in the bar code error detection. The reference length data Dr is representative of the number of transport pulses to be generated during transport of the film slip 5 by the length of the data zone 12 of the bar code 10. During the first frame setting, the CPU 40 measures the width of each bar element of the data zone 12 based on rotation pulses from the motor encoder 55 in the same way as above. In this embodiment, as shown in FIG. 17, the rotation counter 56 starts counting rotation pulses from the motor encoder 55 as soon as the adhesive tape 7 is detected by the initial change of the reflection signal from the low level to the high level.

When the next change of the reflection signal is from the high level to the low level, the CPU 40 regards it as the start of the data zone 12. Then, the count Cm of the rotation counter 56 and the count Cs of the transport counter 46 are both reset to zero, so as to restart counting from zero. If the next change of the reflection signal is not to the low level, the CPU 40 regards it as an error, and effects the shutter locking. Each time the reflection signal changes from the low level to the high level, the count Cs is stored as code length data Ds in the RAM 40a. Thus, when the photo sensor 38 detects the filmstrip 3 following the adhesive tape 7, the code length data Ds stored in the RAM 40a represents the number of transport pulses generated from a leading edge of the first detected black area to a trailing edge of the last detected black area, that normally corresponds to the length of the data zone 12 in the lengthwise direction of the filmstrip 3. As described in the above embodiment, the CPU 40 determines that the filmstrip 3 is detected by the photo sensor 38 when the reflection signal changes from the high level to the middle level.

After the transport motor 48 stops when the first frame exposure portion of the filmstrip 3 is positioned behind the exposure aperture 34, the CPU 40 compares the code length data Ds with the reference length data Dr. If the photo sensor 38 normally reads the bar code 10, the code length data Ds coincides with the reference length data Dr. Accordingly, when the code length data Ds does not coincides with the reference length data Dr, it is regarded as a bar code error.

For example, if there is a stain in either quiet zone 11 or 13, the reflection signal can change from the low level to the high level and again to the low level when the photo sensor 38 scans the stain. Then, the CPU 40 mistakes the stain as the leading or trailing black bar element of the data zone 12. As a result, if the stain is in the leading quiet zone 11, the CPU 40 begins to measure the length of the data zone 12 earlier than the actual start of scanning the data zone 12 by the photo sensor 38. If the stain is in the trailing quiet zone 13, the CPU 40 terminates measuring the length of the data zone 12 later than the actual end of scanning the data zone 12 by the photo sensor 38. In that case, the code length data Ds turns out to be more than the reference length data Dr, so the CPU 40 recognizes the mistake. Therefore, the CPU 40 locks the shutter and warns of the bar code error, in the same way as in the above embodiment.

If the adhesive tape 7 has a bent line or winkle in the data zone 12, the winkle can be mistaken as bar element. However, since the length of the data zone 12 is virtually reduced by the winkle, the code length data Ds detected from the output signal of the photo sensor 38 becomes less than the reference length data Dr. Therefore, the CPU 40 can recognize the mistake, and then makes the shutter locking and gives an error warning, in the same way as above. The operation after the shutter locking may be equal to the above embodiment.

It is possible to provide a tolerance range around the reference length data Dr, so as not to determine it as an bar code error if the code length data Ds is within the tolerance range. It is of course possible to combine the error checking method of the present embodiment with the error checking method of the first embodiment.

Figure 18:
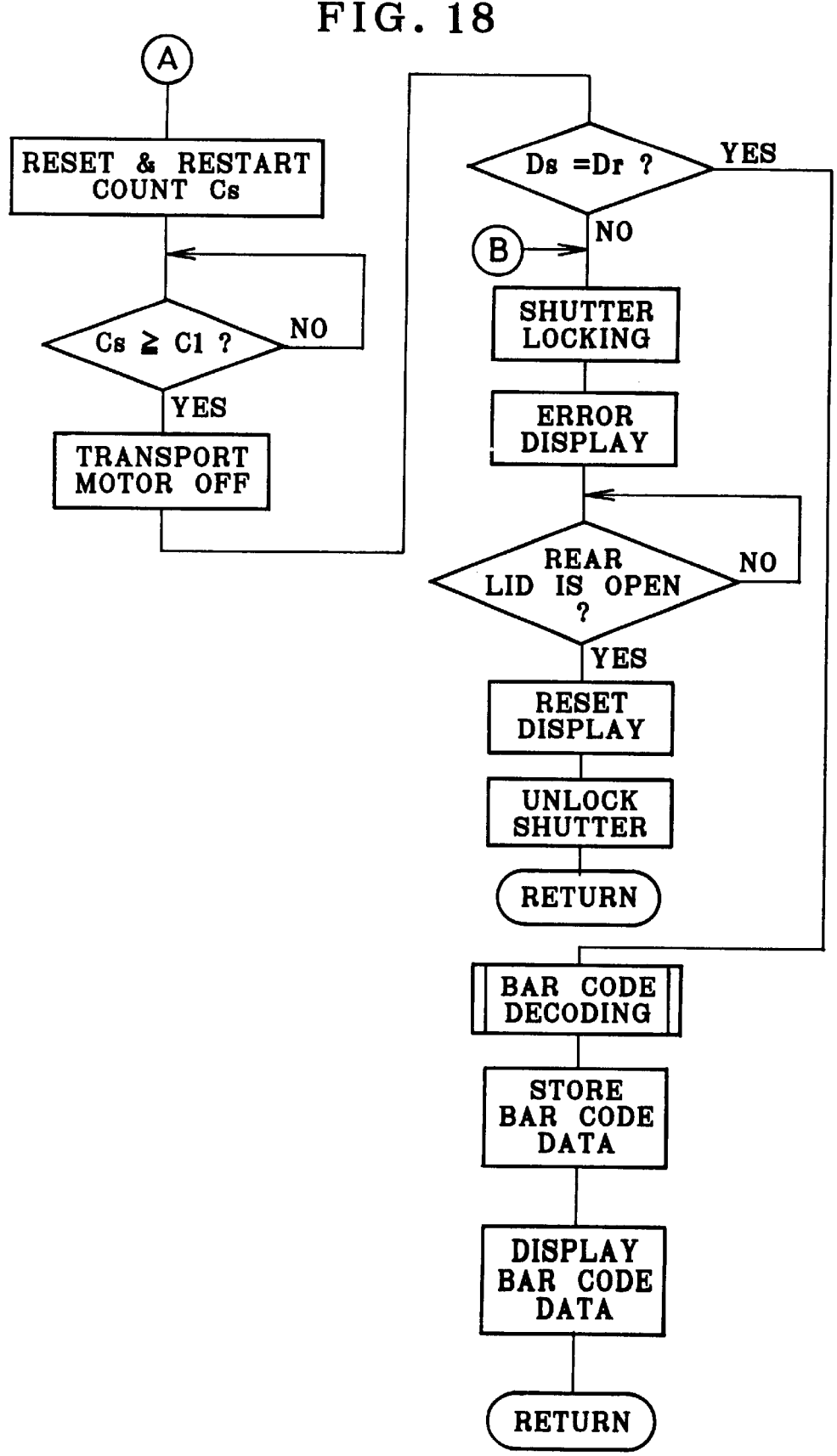

Although the length of the data zone 12 is measured by transport pulses in the embodiment shown in FIGS. 17 and 18, it is possible to measure the length of the data zone 12 by use of rotation pulses. It is of course possible to add up the measured widths of the respective bar elements in order to measure the length of the data zone 12. In those cases, it is necessary to take the increasing diameter of the roll wound about the take-up spool 50, and difference in spool core diameter between different kind take-up spools.

Although the bar code error checking method of the present invention has been described with respect to the camera 20, it is applicable to any bar code reader, e.g. those mounted in a photo finishing device.

FIGS. 19 to 22 show a bar code reader according to another embodiment of the present invention, wherein a mask plate 72 is disposed in front of a reflective photo sensor 71. The photo sensor 71 has a light projecting section 73 and a light receiving section 74 as one body, and the light projecting section 73 has a projection lens 73b in front of a light emitting element 73a that emits near-infrared light, such as an IRED. The light receiving section 74 has a receiving lens 74b in front of a light receiving element 74a, such as a photo diode. The photo sensor 71 is cemented to a barrel-like mounting portion 75a that is formed integrally with a plastic wall 75 of a camera main body in between an exposure aperture 34 and a film supply chamber 31, and more particularly outside an outer periphery of a lens barrel 79. If the body wall of the camera is made of a metal, it is possible to secure the photo sensor 71 to the metal body wall with screw, bolts or the like.

A projection light axis 73c of the photo sensor 71 is defined by positions of the light emitting element 73a and the projection lens 73b, while an incident light axis 74c of the photo sensor 71 is defined by positions of the light receiving element 74a and the receiving lens 74b. The projection light axis 73c and the incident light axis 74c cross at a distance D2 from the front surface of the photo sensor 71. The resolving power of the photo sensor 71 is the highest at the cross point. Therefore, the mounting position of the photo sensor 71 is designed such that the front surface of the photo sensor 71 is spaced by the distance D2 from an obverse surface of an adhesive tape 77 passing through a film passageway 33, on which a bar code 78 is recorded, if the adhesive tape 77 has no winkle or wave. For example, the distance D2 is about 3 mm. In that case, because of the depth of focus of the lenses 73b and 74b, it is possible to read the bar code 78 with sufficient accuracy even while the distance from the photo sensor 71 to the adhesive tape 77 varies in a range from 1.5 mm to 6.5 mm.

The mask plate 72 has a slit 72a that extends laterally to the lengthwise direction of the filmstrip 3, i.e. the transporting direction of the adhesive tape 77. The slit 72a limits both the projection light path from the light projecting section 73 and the incident light path into the light receiving section 74 in the transporting direction, such that the width of a light slit projected onto the adhesive tape 77 and the width of the incident light received on the light receiving section 74 are less than the narrow bar width. For example, the width of the slit 72a is about 0.6 mm. Thereby, the resolving power of the photo sensor 71 is increased, though the signal level of the photoelectric signal from the light receiving element 74a is lowered in total. It is possible to limit one of the projection light path and the reflection light path in the transporting direction, i.e. in the scanning direction of the bar code 78.

Figure 20:
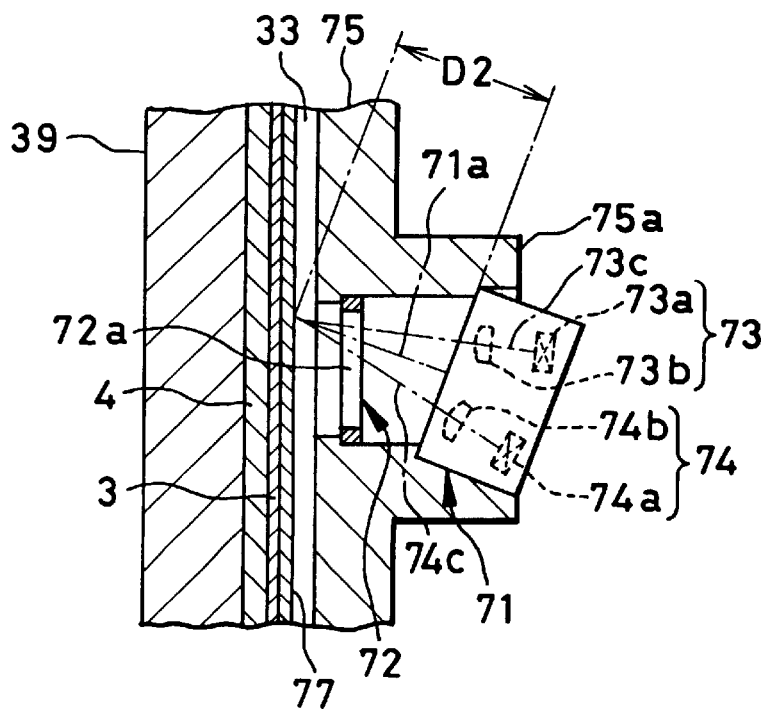
FIG. 20 is a sectional view of the bar code reader of FIG. 19.
Figure 21:
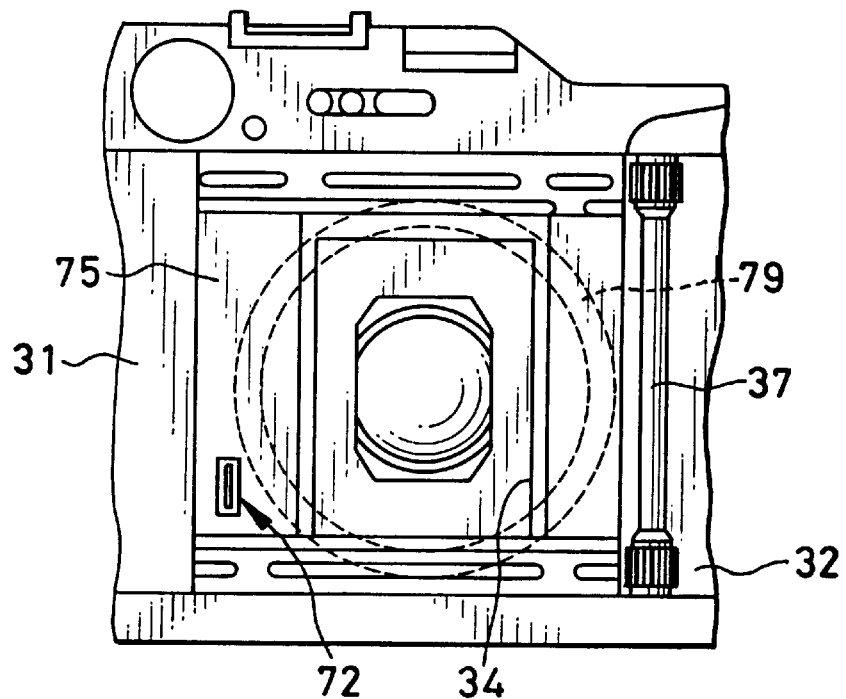
FIG. 21 is a fragmentary view of a camera with its rear lid opened, illustrating a mounting position of the photo sensor of FIG. 19.

Moreover, as shown in FIG. 20, the bisector 71a of the angle between the projection light axis 73c and the incident light axis 74c of the photo sensor 71 is not perpendicular to the surface of the adhesive tape 77 to scan, but is inclined at a given angle, e.g. 20° to 25°. According to this configuration, direct reflection light reflected from the surface of the adhesive tape 77 does not fall on the light receiving section 74, while the light amount falling on the light receiving section 74 does not drop excessively. That is, the photo sensor 71 reads the bar code 78 on the basis of diffused reflection light from the adhesive tape 77.

Figure 19:
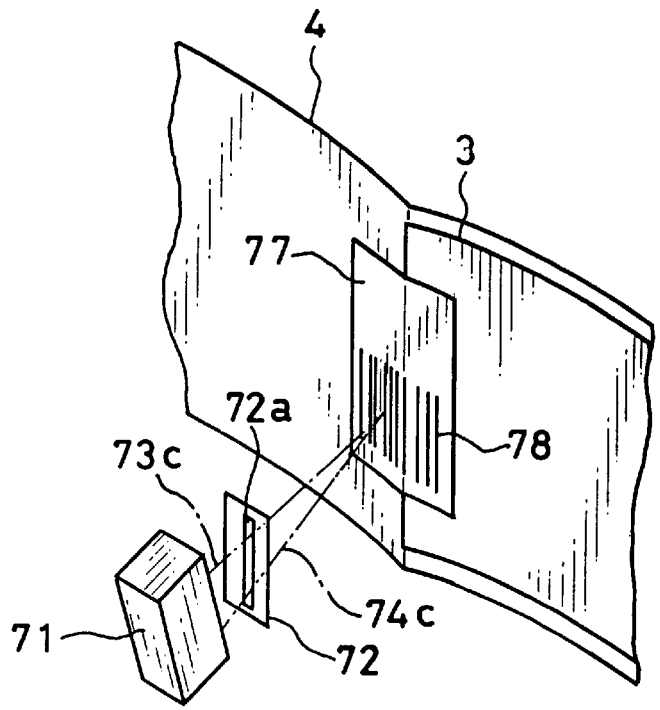
FIG. 19 is an explanatory view of a bar code reader according to another embodiment of the invention.

As shown in FIGS. 19 and 20, the plane including the light axes 73c and 74c of the photo sensor 71 intersects orthogonally with the transporting direction, and while the bisector 71a between the light axes 73c and 74c is not perpendicular to the surface of the adhesive tape 77. Thereby, the angles of the light axes 73c and 74c to the surface of the adhesive tape 77 are maintained approximately constant even where the adhesive tape 77 is bent along the lateral direction of the filmstrip 3, that is, waves in the transporting direction. Since the adhesive tape 77 is most likely to bent along the lateral direction to the transporting direction, the photoelectric signal from the photo sensor 71 is not markedly affected by the wave or winkle of the adhesive tape 77.

The plane including the light axes 73c and 74c should not necessarily intersect orthogonally with the transporting direction, but may be inclined from the orthogonal position, or the plane including the light axes 73c and 74c may extend parallel to the transporting direction. Even in those cases, if the wave of the adhesive tape 77 is small, it is possible to detect a useful photoelectric signal from the photo sensor 71, so long as the bisector 71a between the light axes 73c and 74c is not perpendicular to the surface of the adhesive tape 77, so only diffused reflection light from the adhesive tape 77 is directed to the light receiving section 74. The orientation of the light axes 73c and 74c to the adhesive tape 77 is easy to adjust because the photo sensor 71 is constructed as one body containing the light projecting section 73 and the light receiving section 74.

Figure 22:
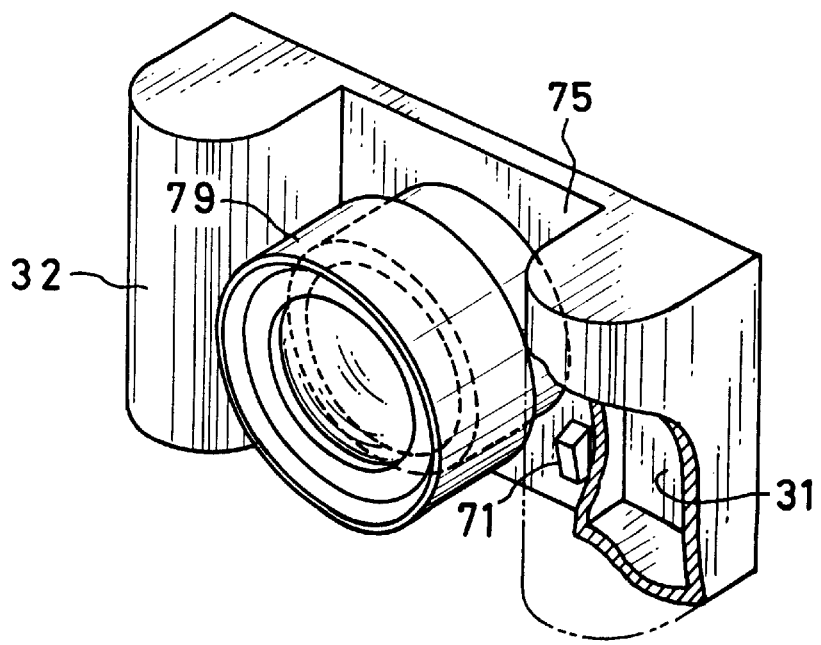
FIG. 22 is an explanatory front view of the camera of FIG. 21.

As shown schematically in FIG. 22, the mounting portion 75a holding the photo sensor 71 protrudes forwardly from the wall 75 of the camera main body. Since the mounting portion 75a is disposed outside the outer periphery of the lens barrel 79, the photo sensor 71 protruding forwardly from the wall 75 would not interfere with the lens barrel 79, even if the lens barrel 79 is of collapsible type. This configuration is preferable in terms of compactness of the camera.

Figure 23:
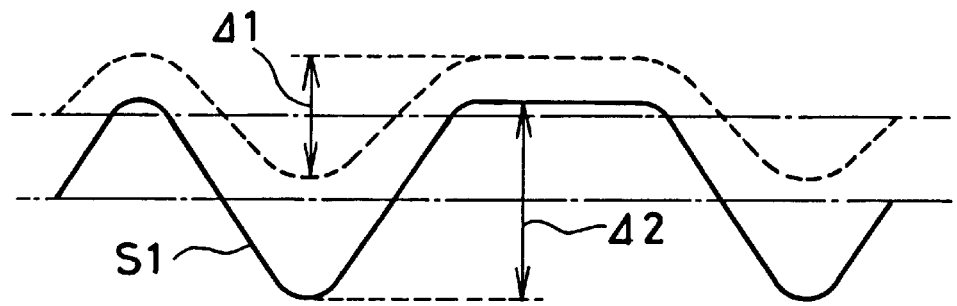
FIG. 23 is a diagram illustrating a photoelectric signal output from a photo sensor inclined to receive diffused reflection light from the bar code, in comparison with that from a photo sensor which receives direct reflection light from the bar code.

FIG. 23 shows by a solid line a photoelectric signal S1 from the photo sensor 71, and a comparative photoelectric signal by dashed lines that is detected from a photo sensor of the same construction but having a perpendicular bisector to the tape surface between the projection light axis and the incident light axis. In either case, the mask plate 72 is not disposed in front of the photo sensor. The level of the comparative photoelectric signal is totally higher than the photoelectric signal S1. The photoelectric signal S1 has a difference Δ1 between a maximum level and a minimum level that is larger than a difference Δ2 between a maximum level and a minimum level of the comparative.

Because of the larger difference Δ1, it is possible to select a threshold value for discrimination between the black bar elements and the white bar element from a wider range than the comparative. For the same reason, a threshold value for the discrimination between the white bar elements and the filmstrip 3 can be selected from a wider range than the comparative. Therefore, discrimination between the black bar element and the white bar element and the filmstrip based on the photoelectric signal S1 is easier than the comparative.

Besides, the comparative photoelectric signal is heavily influenced by the surface smoothness of the adhesive tape 77. On the contrary, the photoelectric signal S1 is not so largely influenced by the surface condition of the adhesive tape 77. Since the material of the adhesive tape 77 varies according to film manufacturer, the photo sensor 71 of the present embodiment is preferable in view of this property.

Figure 24:
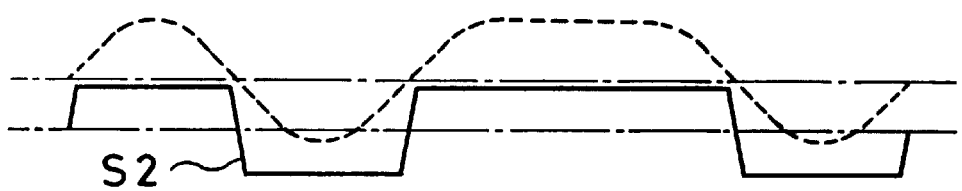
FIG. 24 is a diagram illustrating a photoelectric signal output from a photo sensor with a mask plate in front, in comparison with that from a photo sensor with no mask plate.

FIG. 24 shows by a solid line a photoelectric signal S2 from the photo sensor 71 with the mask plate 72 disposed in front, and a comparative photoelectric signal by dashed lines that is detected from a photo sensor of the same construction, but neither the projection light path nor the incident light path thereof is not limited by a slit. In both cases, the photo sensors are not inclined relative to the surface of the adhesive tape 77. Indeed the total level of the photoelectric signal S2 is lower than the comparative, the change between the low and high levels is steeper than the comparative. Therefore, by providing the mask plate, it becomes possible to use narrower bar elements than conventional and increase the number of bar elements per unit length.

Figure 25:
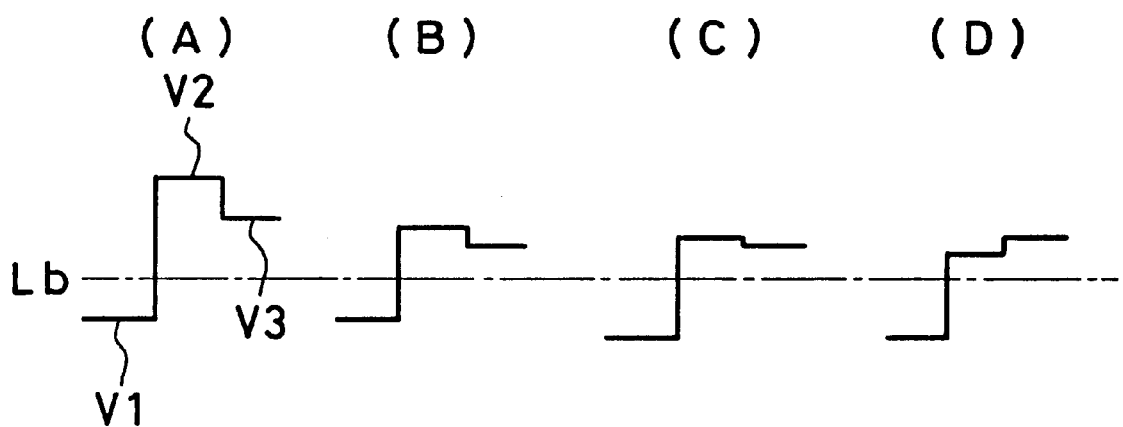
FIG. 25 is a diagram illustrating reflection levels of different kinds of film slips detected through the photo sensor of FIG. 19.
Figure 30:
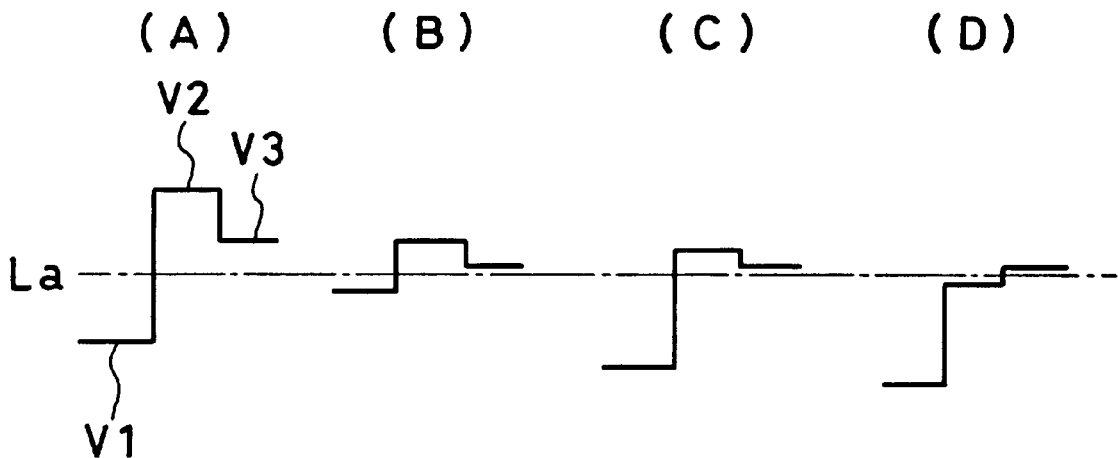
FIG. 30 is a diagram illustrating reflection levels of different kinds of film slips detected through a conventional photo sensor.

FIGS. 25 and 30 show relative reflection levels of a light-shielding paper, an adhesive tape and a filmstrip in each of four different roll films: sample-A, sample-B, sample-C and sample-D, which are sampled from commercially available roll films of different film manufacturers. The reflection levels shown in FIG. 25 are measured by the inclined photo sensor 71 of the present embodiment shown in FIG. 20. On the other hand, the reflection levels shown in FIG. 30 are measured by a photo sensor having the same construction as the photo sensor 71 but not inclined. In FIGS. 25 and 30, low relection levels V1 of the respective output signals of the photo sensors are representative of the dark inside surfaces of the light-shielding papers of the respective samples, high reflection levels V2 are representative of the bright adhesive tapes, and middle reflection levels V3 are representative of the filmstrips.

In order to the photo sensor 71 useful at least for the first frame setting in any type of roll film, even if it has no bar code recorded on the adhesive tape, the photo sensor 71 must be able to discriminate between the light-shielding paper and the adhesive tape or between the light-syyelding paper and the filmstrip regardless of the difference in surface reflection factors of these elements between the different type roll films.

For that discrimination, a threshold level La can only be used in the case shown in FIG. 30. However, the differences between the threshold level La and one or more of the reflection levels V1, V2 and V3 are so slight in the samples-B, C and D, that the reliablility of discrimination cannot be sufficient.

On the contrary, when the photo sensor 71 according to the present invention is used, the reflection level detected from the light-shielding paper of the sample-B is lowered in comparison with that shown in FIG. 30. As a result, a level Lb can be selected as the threshold value by which it is possible to clearly discriminate between the light-shielding paper and the adhesive tape, or between the light shielding paper and the filmstrip. This is very convenient for automatically positioning an initial frame exposure portion or portion to expose first of the filmstrip behind the exposure aperture after the loading of the roll film in the camera.

Figure 26:
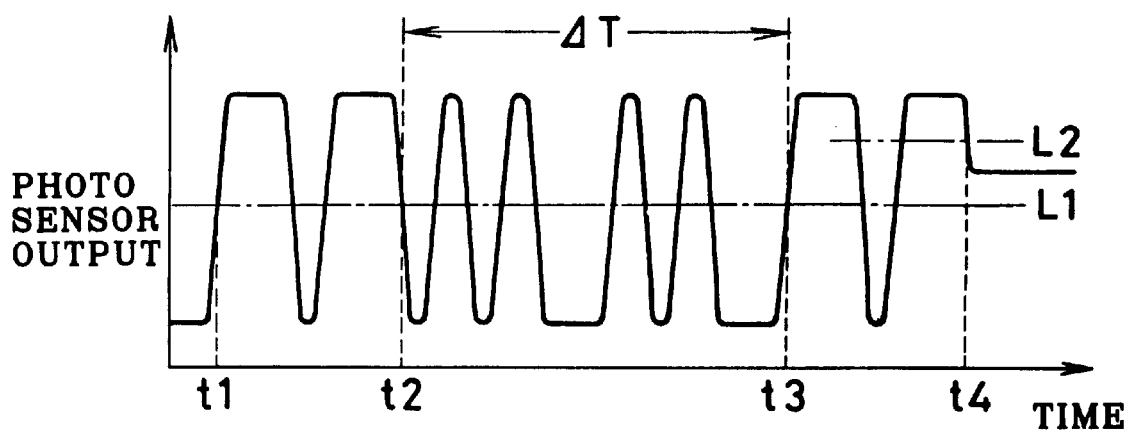
FIG. 26 is a diagram illustrating an example of photoelectric signal output from the photo sensor of FIG. 19.

Now the operation of the embodiment shown in FIGS. 19 to 22 will be described with reference to FIG. 26. When the roll film is loaded and the lear lid is closed, a winding motor is driven upon a rear lid close signal, so that a leader of the light-shielding paper 4 is wound around a spool in a film take-up chamber. During the winding of the leader of the light-shielding paper 4, the photo sensor 71 is opposing the black inside surface of the light-shielding paper 4, so that the output from the photo sensor 71 takes a low level.

When the white adhesive tape 77 comes to a detection range of the photo sensor 71 at a time t1, the output of the photo sensor 71 jumps over a threshold value L1 to a high level. Thereafter when the bar code 78 comes to the detection range of the photo sensor 71, the black bar elements and the white bar elements of the bar code 78 are alternately detected. Specifically, a start bit of the bar code 78 is detected at a time from t1 to t2, and an end bit is detected at a time from t3 to t4, whereas the bar code 78 is read in a time period ΔT from t2 to t3.

The output of the photo sensor 71 detected in the time period ΔT is shaped by a waveform shaping circuit and is decoded to obtain roll film type data, film kind data, film speed data and so forth. The obtained data is written in a memory, and is used for many purpose. For example, it is possible to provide a pressure plate position detector, and give a warning when the position of a pressure plate 39 shown by the detector is not adjusted to the roll film type. To permit resetting the position of the pressure plate 39, it is desirable to provide a film rewinding mechanism in the camera.

After the detection of the end bit, it is determined that the adhesive tape 77 goes past the photo sensor 71 and the filmstrip 3 comes to the detection range of the photo sensor 71 at the time t4, the output of the photo sensor takes a middle level since the reflection factor of the filmstrip 3 is lower than that of the adhesive tape 77 but higher than that of the black bar element or the black inside surface of the light-shielding paper 4.

Therefore, it is possible to determine that the leading end of the filmstrip 3 passes in front of the photo sensor 71 that is placed before the exposure aperture 34 when the output of the photo sensor 71 goes below a higher threshold value L2 than the threshold value L1 after the detection of the end bit. Therefore, it is possible to measure advanced length of the filmstrip from the time t4 on the basis of rotation pulses or transport pulses, in the same way as the first embodiment.

In this way, as the photo sensor 71 is provided with the projection lens 73b and the light receiving lens 74b to increase the depth of detection range, it is possible to read the bar code 78 with sufficient accuracy even while the distance from the photo sensor 71 to the adhesive tape 77 varies because of the curl and the wave of the adhesive tape 77. In addition, since the photo sensor 71 is inclined so as not to receive direct reflection light from the roll film 5, it becomes possible to more clearly discriminate the black bar elements and the white bar elements. Since it makes possible to clearly discriminate between the light-shielding paper and the adhesive tape, or between the light shielding paper and the filmstrip, an initial frame exposure portion can automatically be positioning behind the exposure aperture after the loading of the roll film in the camera.

Since the plane including the light axes 73c and 74c of the photo sensor 71 intersects orthogonal to the transporting direction, while the bisector 71a between the light axes 73c and 74c is not perpendicular to the surface of the adhesive tape 77, the angles of the light axes 73c and 74c to the surface of the adhesive tape 77 are maintained approximately constant even where the adhesive tape 77 is bent along the lateral direction of the filmstrip 3. So the photoelectric signal from the photo sensor 71 is not markedly affected by the wave or winkle of the adhesive tape 77.

Figure 27:
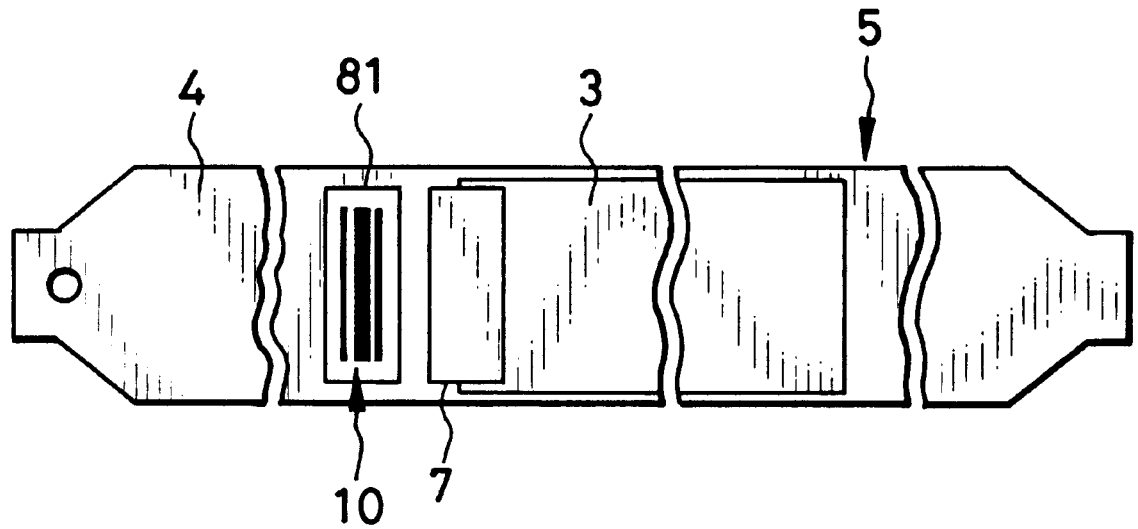
FIG. 27 is an explanatory view of a film slip wherein an adhesive tape with a bar code recorded thereon is put on a light-shielding paper.
Figure 28:
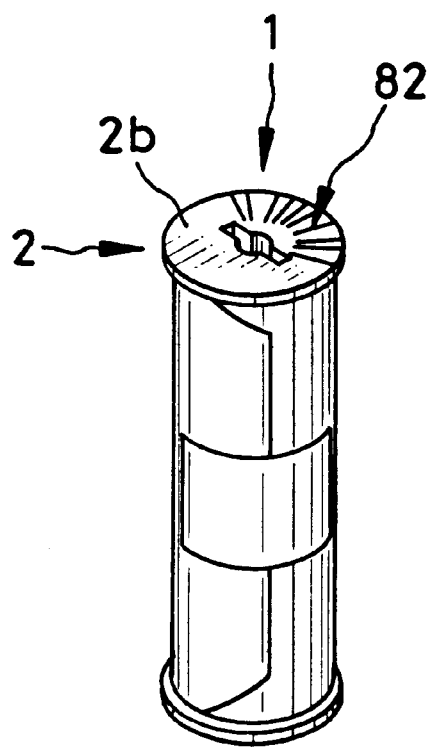
FIG. 28 is a perspective view of a photographic roll film having a bar code recorded on the flange of the spool.

Although the bar code 10 is recorded on the adhesive tape 7 in the above embodiment, it is possible to record a bar code 10 on another tape 81 and stick the tape 81 onto a leading portion of the light-shielding paper 4 or 4c before the adhesive tape 7, as shown in FIG. 27. The camera of the present invention is useful for a roll film using a film slip 5 of FIG. 27. It is also possible to provide a bar code 82 on the outer surface of a flange 2b of a spool 2, as shown in FIG. 28, wherein the bar code 82 consisting of radial bar elements arranged around the rotational center of the spool 2. In that case, a photo sensor should be mounted to the inner top wall of the film supply chamber.

The present invention is applicable to those cases where white bar elements are printed on a black surface, e.g. on a black inside surface of the light shielding paper, and where black bar elements are printed on the filmstrip.

Although the border between the adhesive tape and the filmstrip is used as a reference position or a starting position to measure the film transport length for the first frame setting in the above embodiment, it is possible to use the border between the light-shielding paper and the adhesive tape as the reference position, because the size of the adhesive tape is predetermined by the ISO standard for roll film. This variation is preferable for those roll films where the reflection factor of the adhesive tape is not so different from that of the filmstrip.

Thus, the present invention is not to be limited by the embodiment shown in the drawings but, on the contrary, various modifications are possible to those skilled in the art without departing from the scope of claims attached hereto.

What is claimed is:

1. A camera for use with a Brownie roll film consisting of a spool and a film slip rolled on the spool, the film slip comprising a photo filmstrip, light-shielding paper provided at least on leading and trailing ends of the filmstrip, an adhesive tape for securing the light-shielding paper to the filmstrip at least at the leading end of the filmstrip, and a bar code provided on at least one of the adhesive tape, the light-shielding paper and the spool, the bar code containing data about the roll film, the camera comprising:

a film supply chamber for accepting the roll film;

a film take-up chamber with a take-up spool which is engaged with a leading end of the light-shielding paper of the roll film;

a film winding device for rotating the take-up spool to wind up the film slip onto the take-up spool;

a bar code reader for reading the bar code while the film slip is transported from the film supply chamber to the film take-up chamber; and means for determining a measured length of a data portion of the bar code and comparing the measured length to a predetermined proper length.

2. The camera of claim 1, wherein data represented by the bar code contains data of length of the film-strip, and wherein the camera further comprises a device for deriving the number of exposures available on the filmstrip from the length of the filmstrip detected through the bar code reader.

3. A camera according to claim 2, further comprising a device for counting the number of accomplished exposures to determine the remaining number of available exposures based on the number of available exposures derived from the length data, and a warning device which gives a warning when the remaining number of available exposures comes down to one.

4. A camera according to claim 3, wherein the film winding device rotates the take-up spool to wind up the entire length of the film slip onto the take-up spool after all the available exposures are accomplished.

5. A camera according to claim 3, further comprising a display device for displaying the remaining number of available exposures.

6. A camera according to claim 1, wherein data represented by the bar code contains data of film speed of the filmstrip, and wherein the camera further comprises an exposure control device for controlling each exposure considering the film speed detected through the bar code reader.

7. A camera according to claim 1, wherein the bar code reader comprises a photo sensor, and an error checking device for checking if there is any error in output signal from the photo sensor, and wherein the camera further comprises a warning device for giving a warning when the error checking device detects an error.

8. A camera according to claim 1, wherein the bar code reader comprises a photo sensor, and an error checking device for checking if there is any error in output signal from the photo sensor, and wherein the camera further comprises a locking device for locking a shutter of the camera when the error checking device detects an error.

9. A camera for use with a roll film consisting of a spool and a film slip rolled on the spool, the film slip comprising a photo filmstrip, light-shielding paper provided at least on leading and trailing ends of the filmstrip, an adhesive tape for securing the light-shielding paper to the filmstrip at least at the leading end of the filmstrip, and a bar code provided on the adhesive tape or on the light-shielding paper, the bar code consisting of a data zone and quiet zones disposed on opposite ends of the data zone, the camera comprising:

a film supply chamber for accepting the roll film;

a film take-up chamber with a take-up spool which is engaged with a leading end of the light-shielding paper of the roll film;

a film winding device for rotating the take-up spool to wind up the film slip onto the take-up spool;

a photo sensor for scanning the bar code while the film slip is transported from the film supply chamber to the film take-up chamber;

a bar code decoder for decoding the bar code by use of output signal from the photo sensor;

a measuring device for measuring transport length of the film slip from the film supply chamber to the film take-up chamber; and an error checking device which determines a start and an end of scanning the data zone of the bar code based on the output signal from the photo sensor, detects a length of the data zone as a transport length of the film slip measured by the measuring device during a time period from the start to the end of scanning the data zone, and compares the measured length of the data zone with a preset actual length of the data zone, the error checking device determining that the output signal from the photo sensor includes an error when the measured length of the data zone is not identical to the preset actual length.

10. A camera according to claim 9, wherein the measuring device comprises a roller member that is rotated along with the film slip being transported, an encoder coupled to the roller member so as to output a transport pulse each time the film slip is transported by a given length, and a counter counting the transport pulse, the count of the counter is used for controlling transport of the film slip.

11. A camera according to claim 9, further comprising a warning device for giving a warning when the error checking device detects an error.

12. A camera according to claim 9, further comprising a locking device for locking a shutter of the camera when the error checking device detects an error.

13. A camera according to claim 9, further comprising a first frame setting device for automatically setting a first frame exposure portion of the filmstrip behind an exposure aperture formed in between the film supply chamber and the film take-up chamber, the first frame setting device determining based on the output signal from the photo sensor when the adhesive tape goes past the photo sensor, and stopping the film winding device when the transport length of the film slip reaches a given value from the time of passage of the adhesive tape by the photo sensor.

14. An error checking method for checking if there is any error in output signal from a photo sensor that scans a bar code provided on a film slip of a roll film while the film slip is transported in a direction, the method comprising the steps of:

measuring transport length of the film slip;

determining a start and an end of scanning the bar code based on the output signal from the photo sensor;

detecting a length of the bar code as a transport length of the film slip measured during a time period from the start to the end of scanning the bar code;

comparing the measured length of the bar code with a preset actual length of the bar code; and determining that the output signal from the photo sensor includes an error when the measured length of the bar code is not identical to the preset actual length.

15. A method according to claim 14, wherein the film slip comprises a photo filmstrip, light-shielding paper provided at least on leading and trailing ends of the filmstrip, and an adhesive tape for securing the light-shielding paper to the filmstrip at least at the leading end of the filmstrip, and wherein the bar code is provided on the adhesive tape or on a leading portion of the light-shielding paper, preceding the leading end of the filmstrip in the transporting direction, such that the bar code is scanned immediately after loading the roll film.

16. A camera for use with a roll film consisting of a spool and a film slip rolled on the spool, the film slip comprising a photo filmstrip, light-shielding paper provided at least on leading and trailing ends of the filmstrip, an adhesive tape for securing the light-shielding paper to the filmstrip at least at the leading end of the filmstrip, and a bar code provided on the adhesive tape, the bar code consisting of bar elements of a narrow width and bar elements of a wide width, the bar elements extending orthogonally to the transporting direction of the film slip, the camera comprising:

a film supply chamber for accepting the roll film;

a film take-up chamber with a take-up spool which is engaged with a leading end of the light-shielding paper of the roll film;

a film winding device for rotating the take-up spool to wind up the film slip onto the take-up spool;

a reflective photo sensor mounted to face a film passageway between the film supply chamber and the film take-up chamber, for scanning the bar code while the film slip is transported from the film supply chamber to the film take-up chamber, the photo sensor comprising a light projecting element and a light receiving element; and a mask plate disposed in front of the photo sensor, the mask plate limiting a projection light path from the light projecting element and/or a reflection light path from the film slip to the light receiving element, so as to limit the width of detection range of the photo sensor to be less than the narrow width of the bar elements.

17. A camera according to claim 16, wherein the mask plate and the photo sensor are mounted in a recessed position from a wall forming the film passageway, to provide the detection range of the photo sensor with a depth in a perpendicular direction to the film passageway.

18. A camera according to claim 17, further comprising:

a bar code decoder for decoding the bar code by use of output signal from the photo sensor;

a measuring device for measuring transport length of the film slip from the film supply chamber to the film take-up chamber; and a first frame setting device for automatically setting a first frame exposure portion of the filmstrip behind an exposure aperture formed in between the film supply chamber and the film take-up chamber, the first frame setting device determining based on the output signal from the photo sensor when the adhesive tape goes past the detection range of the photo sensor, and stopping the film winding device when the transport length of the film slip reaches a given value from the time of passage of the adhesive tape through the detection range of the photo sensor.

19. A bar code reader for use in a camera to read a bar code that is provided on a photo film while the photo film is transported through a film passageway from a film supply chamber to a film take-up chamber, the bar code consisting of bar elements extending orthogonally to the transporting direction of the photo film, the bar code reader comprising:

a reflective photo sensor having a light projecting section and a light receiving section which are integrated into one body such that a projection light axis of the light projecting section and a reflection light axis of the light receiving section are fixed relative to each other, the light projecting section consisting of a light emitting element and a projection lens disposed in front of the light emitting element, the light receiving section consisting of a light receiving element and a light receiving lens disposed in front of the light emitting element, wherein the photo sensor is mounted in the camera such that a bar code surface having the bar code thereon passes through a cross point of the projection light axis and the reflection light axis while the photo film is transported through the film passageway, and that a bisector between the projection light axis and the reflection light axis is not perpendicular to the bar code surface in the film passageway.

20. A bar code reader according to claim 19, wherein the photo film is a Brownie roll film having a filmstrip and light-shielding paper secured to at least one end of the filmstrip by an adhesive tape, and the bar code surface is an obverse surface of the adhesive tape.

21. A bar code reader according to claim 19, wherein a plane including the projection light axis and the reflection light axis intersects orthogonally with the transporting direction of the photo film.

22. A bar code reader according to claim 19, wherein the photo sensor is mounted in a position recessed from a front wall of the film passageway in between the film supply chamber and an exposure aperture.

23. A bar code reader according to claim 22, wherein the camera has a collapsible lens barrel, and the photo sensor is disposed outside an outer periphery of the lens barrel.

24. A bar coder reader according to claim 19, further comprising a mask plate disposed in front of the photo sensor, the mask plate limiting a projection light path from the light projecting element and/or a reflection light path to the light receiving element in the transporting direction of the film, so as to limit the width of detection range of the photo sensor to be less than a minimum width of the bar elements.

* * * * *